(12) United States Patent
Kelly et al.

(10) Patent No.: US 6,306,035 B1
(45) Date of Patent: Oct. 23, 2001

(54) GRAPHICAL USER INTERFACE FOR PROVIDING GAMING AND PRIZE REDEMPTION CAPABILITIES

(75) Inventors: Matthew F. Kelly, San Ramon; Bryan M. Kelly, Alamo; Norman B. Petermeier, Pleasanton; John G. Kroeckel, San Ramon; John E. Link, Tracy, all of CA (US)

(73) Assignee: Arcade Planet, Inc., Livermore, CA (US)

( * ) Notice: Subject to any disclaimer, the term of this patent is extended or adjusted under 35 U.S.C. 154(b) by 0 days.

(21) Appl. No.: 09/433,839

(22) Filed: Nov. 3, 1999

Related U.S. Application Data

(63) Continuation-in-part of application No. 09/040,654, filed on Mar. 17, 1998, which is a continuation of application No. 08/746,755, filed on Nov. 14, 1996, now Pat. No. 5,816,918.

(51) Int. Cl.[7] .................................................. A63F 9/24
(52) U.S. Cl. ............................................. 463/25; 463/42
(58) Field of Search ................................... 463/1, 16, 17, 463/22, 23, 25, 26, 27, 28, 30, 36, 37, 42; 273/138.1, 139, 440

(56) References Cited

U.S. PATENT DOCUMENTS 6,012,984  1/2000  Roseman .............................. 463/42

Primary Examiner—George Manuel
(74) Attorney, Agent, or Firm—Oppenheimer Wolff & Donnelly LLP

(57) ABSTRACT

The present invention provides a graphical user interface for providing gaming and prize awarding and redeeming capabilities to a computer network system in a manner that lets a provider of the network system present and display information to a user of the network system. The graphical user interface allows for the showing of a frame, or screen/display, to the user while also allowing a game to be executed in the frame. Indicated on the frame are prize credits awarded based on an outcome of playing the game. Additionally, a link is displayed on the frame for depicting a prize redemption interface designed to allow use of the prize credits to obtain a prize offered on the network system.

20 Claims, 16 Drawing Sheets

GRAPHICAL USER INTERFACE FOR PROVIDING GAMING AND PRIZE REDEMPTION CAPABILITIES

CROSS REFERENCE TO RELATED APPLICATIONS

This application is a continuation-in-part of co-pending parent patent application Ser. No. 09/040,654 filed Mar. 17, 1998 which in turn is a continuation of patent application Ser. No. 08/746,755 filed Nov. 14, 1996, now issued under U.S. Pat. No. 5,816,918 all of which are hereby incorporated by reference herein in their entirety.

FIELD OF THE INVENTION

The present invention generally relates to graphical user interfaces and more particularly pertains to providing a graphical user interface for a network gaming system.

BACKGROUND OF THE INVENTION

Standardized large-scale networks such as the Internet and the World Wide Web now allow remotely located users (such as at home users) to play video games in an environment that allows the user to select a wide variety of different types of video games provided by several different network gaming system providers. Such standardized large-scale networks also allow a user to play with or compete against other users across the network system.

While providing a prize awarding and redeeming system may be desirable to a game provider over a network gaming system, maintenance of a prize awarding and redeeming system may be very laborious and highly involving for the game provider. A prize awarding and redeeming system must be capable of tracking game credits, prize credits, conversions between game scores and prize credits, etc. Further, the prize awarding and redeeming system must convey this information to users in an effective manner.

Displaying and presenting information of a prize awarding and redeeming system while a user is playing a game of a game provider through the network gaming system is a major problem to overcome. The provider has to present a large amount of information to a user on a single visual display such as a video display monitor. For example, the provider may need to display a current amount of credits available to the user, a current amount of prize credits accumulated by the user, a list of possible prizes available to the user, and even a list of high scores for the game currently being played by the user. The prize provider must find a way to display as much of this information as possible on the visual display of the user in a manner that the user can quickly and easily locate and refer to while still providing enough space for the user to view their selected game on their visual display.

If the information of the prize awarding and redeeming system is poorly presented, the user may have to spend too much time in locating, accessing and retrieving the information. This may lead to the player being distracted from the playing of the game at hand for a duration that is unacceptable for the user. As a result the user may quickly grow dissatisfied with the game and prize system and cease to participate in the game and the prize system.

Additionally, if the information of the prize awarding and redeeming system is presented in a manner that is difficult for users to use, the users may grow weary of spending excessive time locating and retrieving this information. This problem is further exacerbated for users who are connected to the Internet via relatively slow connections such as a modem/telephone line connection. If the information of the prize awarding and redeeming system must be retrieved by a user by accessing additional frames or screens on their visual display, the time the user may have to expend may be excessive and interfere with the user's play of their selected game.

SUMMARY OF INVENTION

The present invention provides a graphical user interface for providing gaming and prize awarding and redeeming capabilities in a computer network system. This invention allows a provider of the network system to present and display information to a user of the network system. In particular, the present invention allows a provider to visibly display to a user the large amount of information needed to effectively present the provider's prize awarding and redeeming system while the user is playing a game on the network system.

More specifically, the present invention provides a game interface for a prize awarding and redeeming system to a user of the computer network system by displaying a frame to the user and allowing a game to be executed in the frame. Indicated on the frame are prize credits awarded based on an outcome of playing the game. Additionally, a link is displayed on the frame for depicting a prize redemption interface designed to allow use of the prize credits to obtain a prize offered on the network system. This way, a prize provider displays information on the visual display of the user in a manner that the user can quickly and easily locate and refer to while still providing enough space for the user to view their selected game on their visual display.

In one embodiment of the present invention, an additional link may be displayed on the frame for allowing a user to select which one of a plurality of games is executed in the frame. This permits a user to easily switch from playing one game to another. The present invention may also include the displaying of a start button which, when selected, begins execution of the game displayed in the frame.

In another embodiment, a further link may be displayed on the frame for allowing a user to purchase game credits required prior to execution of the game in the frame. Another embodiment of the present invention event provides an indication on the frame of a number of game credits available to a user to exchange for execution of the game in the frame.

In yet another embodiment of the present invention, conversion information may also be displayed on the frame which dictates an amount of prize credits that are awarded based on the outcome of the displayed game. This feature allows the prize provider to accommodate the display of the accumulation of prize redeemable points from a user's play of several different games. This feature allows the prize provider to easily present a redeeming system that takes into account the distinction in points accumulated from easy and more difficult games and also allows the user to seamlessly switch play between different games with no break in the user's accumulation of prize credits and prizes.

Additionally, the present invention may also display a specific prize to be awarded based on the outcome of the game. In such an embodiment, the specific prize may be displayed prior to the prize actually being awarded. This feature allows a prize provider to easily and selectively display unique prizes provided to help attract users to play a particular game on the network system. In another aspect of the present invention the frame may be configured using dynamic HTML.

These embodiments allow for the information of the prize awarding and redeeming system to be clearly presented so that a user does not have to spend too much time in locating, accessing and retrieving the information. This way, users are not distracted from the play of their games at hand when checking their progress in accumulating prize credits and prizes. By displaying information for the prize awarding and redeeming system in the manner set forth by the present invention, the user is relieved of the burden of spending excessive time accessing and retrieving prize information during use of the network gaming system, especially when the user is connected to the system via slow connections such as a modem/telephone line connection.

These and other advantages of the present invention will become apparent to those skilled in the art after reading the following descriptions and studying the various figures of the drawings.

DETAILED DESCRIPTION OF THE PREFERRED EMBODIMENTS

Figure 1:
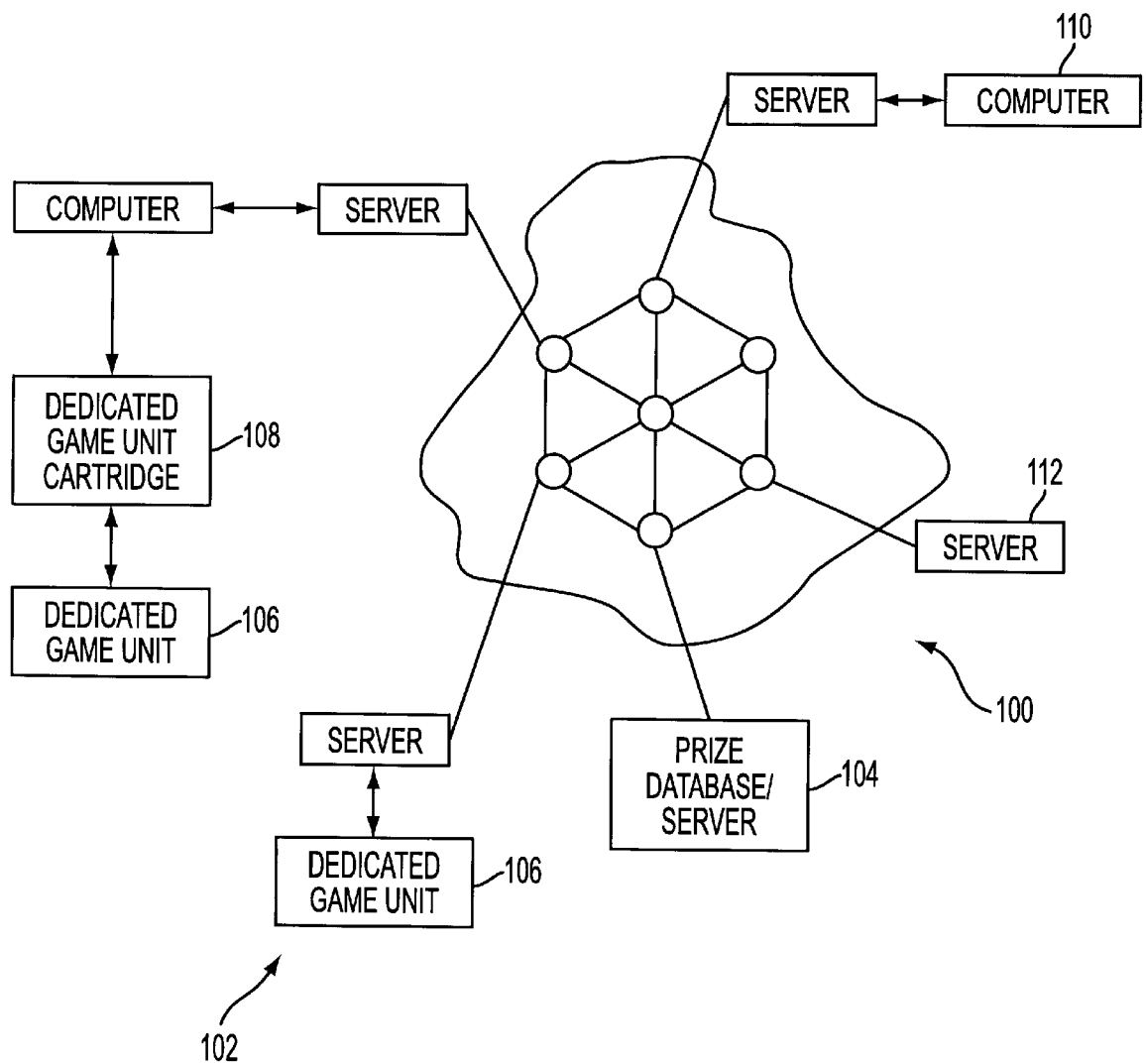
FIG. 1 is a schematic diagram of a wide area network which interconnects a plurality of game apparatuses for facilitating a prize redemption system in accordance with one embodiment of the present invention.

FIG. 1 is a schematic diagram of the present invention which is adapted for allowing redemption of prizes won while playing games on a plurality of networked game apparatuses. As shown in FIG. 1, a wide area network 100, i.e. the Internet, interconnects a plurality of game apparatuses 102 for facilitating a prize redemption system. Such game apparatuses 102 are each adapted for displaying a user interface which in turn allows a user to play a plurality of games. Also included is a prize database server 104, adapted for connecting to the game apparatuses 102 via the wide area network 100 for communication via a protocol such as TCP/IP or IPX. As an option, the prize database server 104 may also function at least in part as a game apparatus 102.

In use, a user identification code is received by the prize database server 104 from the game apparatuses 102 that corresponds to the user. After play of a game is complete, an indication of an outcome of the game is also received by the prize database server 104. The prize database server 104 also tracks a number of prize credits awarded the user based on the outcome of the present game and/or previous games. Further, the prize database server 104 functions to allow redemption of the prize credits for a prize.

With continuing reference to FIG. 1, at least some of the game apparatuses 102 include dedicated game units 106 which are commonly used in combination with televisions or are portable in nature for the sole purpose of playing various games. Such dedicated game units 106 may include a NINTENDO, SEGA or SONY game unit or a game implemented on a personal digital assistant such as a PALM PILOT.

In one embodiment, the dedicated game units 106 each include a modem to connect with the wide area network for communication purposes. In the alternative, the dedicated game units may each include a removable cartridge 108 which may or may not contain one or more specific games, and also allow storage of information, i.e. an identification code and an indication of an outcome of the game. Such cartridges 108 may further be adapted for being releasably received in a specially-adapted port such as a DEXDRIVE connected to a computer which is in turn connectable with the wide area network 100 for communication purposes. In the case of a personal digital assistant such as a PALM PILOT, a HOTSYNC module may be used to communicate information with the computer.

In another embodiment, at least some of the game apparatuses 102 include desktop or laptop computers 110 each having a modem to connect with the wide area network 100 for communication purposes. In still yet another embodiment, at least some of the game apparatuses 102 include servers 112 for allowing communication with a plurality of computers 110 via the wide area network 100.

As an option, some of the game apparatuses may include stand-alone units capable of printing prize credits in the form of tickets, coupons, magnetically readable cards, cards with bar-codes, or any other type of "smart" card which may be redeemable at the site of the game apparatus. More information on such game apparatuses may be had by reference to U.S. Pat. No. 5,292,127, by Kelly et al. which is hereby incorporated by reference herein in its entirety. It should be noted that the various aforementioned game apparatuses may be used in any combination.

Figure 2:
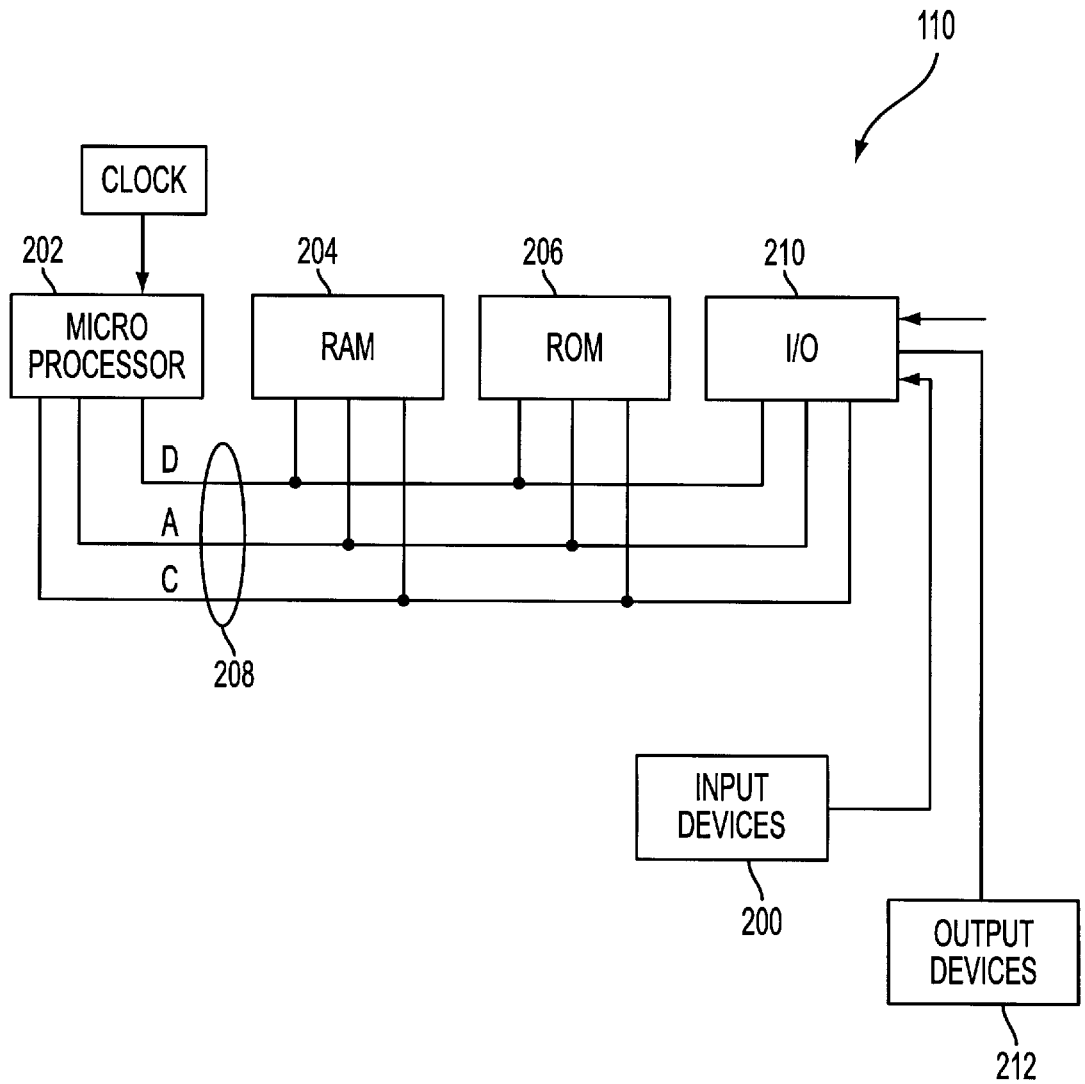
FIG. 2 is a block diagram of various components used in one of the game apparatuses of FIG. 1.

FIG. 2 is a schematic diagram of one of the aforementioned computers 110. As shown, input devices 200 may be used by a player or user to provide input to the game unit to influence game events during a game process and to achieve one or more predetermined goals or tasks for scoring points and winning prizes or other types of awards. The input devices 200 can also be used to select prizes within the redemption system of the present invention. Alternatively, separate input controls can be used for the prize functions of the game unit.

Player input typically includes game commands provided by controlling devices such as buttons, keyboard, dials, joystick controls, touch screen, track ball, mouse, gun device, steering wheel, foot pedals, speech input through a microphone, or any other input used in playing a game and providing selections. For example, the player can move a joystick to control a graphical object displayed on a video screen. Each type of user input can provide a particular game command to the computer, and the computer interprets the commands and influences game states and game events in the game process accordingly.

With continuing reference to FIG. 2, the computer 110 receives signals and commands from the player input devices 200 and translates/interprets those signals and commands so that the game process can be updated. The computer 110 preferably includes a microprocessor 202, random access memory (RAM) 204, read-only memory (ROM) 206, and input/output (I/O) 210. Microprocessor 202 can be any processor or controller with features sufficient to control the game apparatus. For example, a suitable microprocessor 202 for many mechanical game applications is the Intel 8031 8-bit microprocessor, which includes eight data lines and sixteen address lines. Alternatively, more powerful microprocessors, such as Pentium-class/Power PC class microprocessors, or specialized graphical or digital signal processors, can be used. Microprocessor 202 executes a process, described by software instructions stored in memory, which recognizes a game command from player input devices 200. The software instructions can be stored in a "computer readable medium", which, by way of example, includes memory such as RAM and ROM, magnetic disks, magnetic tape, optically readable media such as CD ROMs, semiconductor memory such as memory chips or PCMCIA cards, etc. In each case, the medium may take the form of a portable item such as a small disk, diskette, cassette, memory module, etc., or it may take the form of a relatively larger or immobile item such as a hard disk drive.

Microprocessor 202 is coupled to RAM 204 by a data (D)/address (A)/control (C) bus 208 to permit the use of the RAM 204 for scratch-pad memory and other functions during a game process. ROM 306 is preferably an erasable, programmable read-only memory (EPROM) that contains the start-up instructions and operating system for the microprocessor 202. Methods for coupling RAM 204 and ROM 206 to the microprocessor 202 by bus 208 including data, address, and control lines are well-known to those skilled in the art.

I/O 210 includes buffers, drivers, ports, registers, and other analog and/or digital circuitry to interface inputs and outputs with the bus 208. Game output devices 212 and input devices 200 can be coupled to I/O 210. For example, a display screen can be coupled to I/O 210 so that the microprocessor or another video processor can control the display of images on the display screen, as is well known to those skilled in the art.

The computer can include plug-in interface cards such as video cards, 3-D graphics cards, sound cards, controller cards, etc. Standard peripherals can be coupled to the I/O 210 as input devices 200 and output devices 212, such as a CD-ROM drive, storage device (floppy disk drive, hard disk drive, etc.), PCMCIA card, printer, stylus and tablet, microphone for voice recognition, camera, or communication device.

Figure 3:
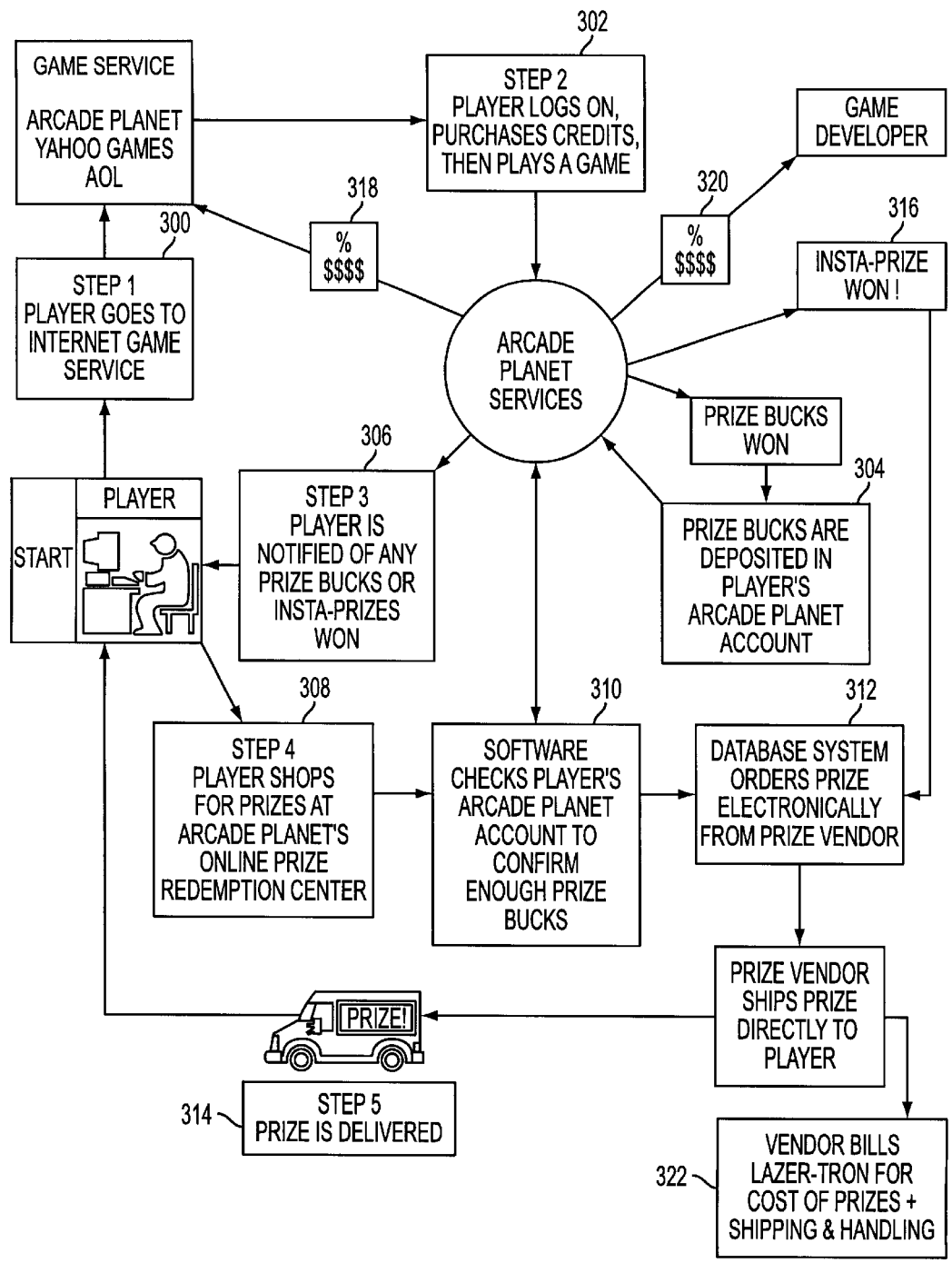
FIG. 3 is a general functional diagram of the prize redemption system of FIG. 1 in accordance with one embodiment of the present invention.

FIG. 3 is a functional diagram illustrating an overview of the interaction among various users, computers, servers, business entities, etc. during the course of use of the present invention. As shown, in one embodiment, a user utilizes a game apparatus, i.e. computer, for directly or indirectly accessing a server which provides a plurality of games in operation 300. In one embodiment, the user may access the game server via any particular related or unrelated hosting web site. Next, in operation 302, the user logs on, purchases credits(optional), and plays a game provided by the server. During the course of the game, any prize credits earned are deposited in an account of the user, as indicated in operation 304.

With continuing reference to FIG. 3, the user is notified of any prize credits that may have resulted from the play of the game, as indicated in operation 306. Thereafter, in operation 308, the user may again use the game apparatus to access the prize database server which may or may not be separate from the game server. An account of the user is then checked to verify a current number of prize credits available. See operation 310. Then, in operation 312, the game database orders any prizes selected by the user from a prize vendor. The prize is then delivered to the user in operation 314. In the case where a prize credit that represents a specific prize is awarded in operation 316, the prize database server does not require any selection prior to ordering in operation 312.

Any monetary gain resulting from the method of the present invention may be distributed in various ways. For example, an owner of a hosting web site may be compensated for providing access to the games via the hosting web site. Note operation 318. Further, a developer of the games may be compensated in operation 320. The prize vendor may also receive funds for cost of prizes, shipping, handling, etc. in operation 322.

Figure 4:
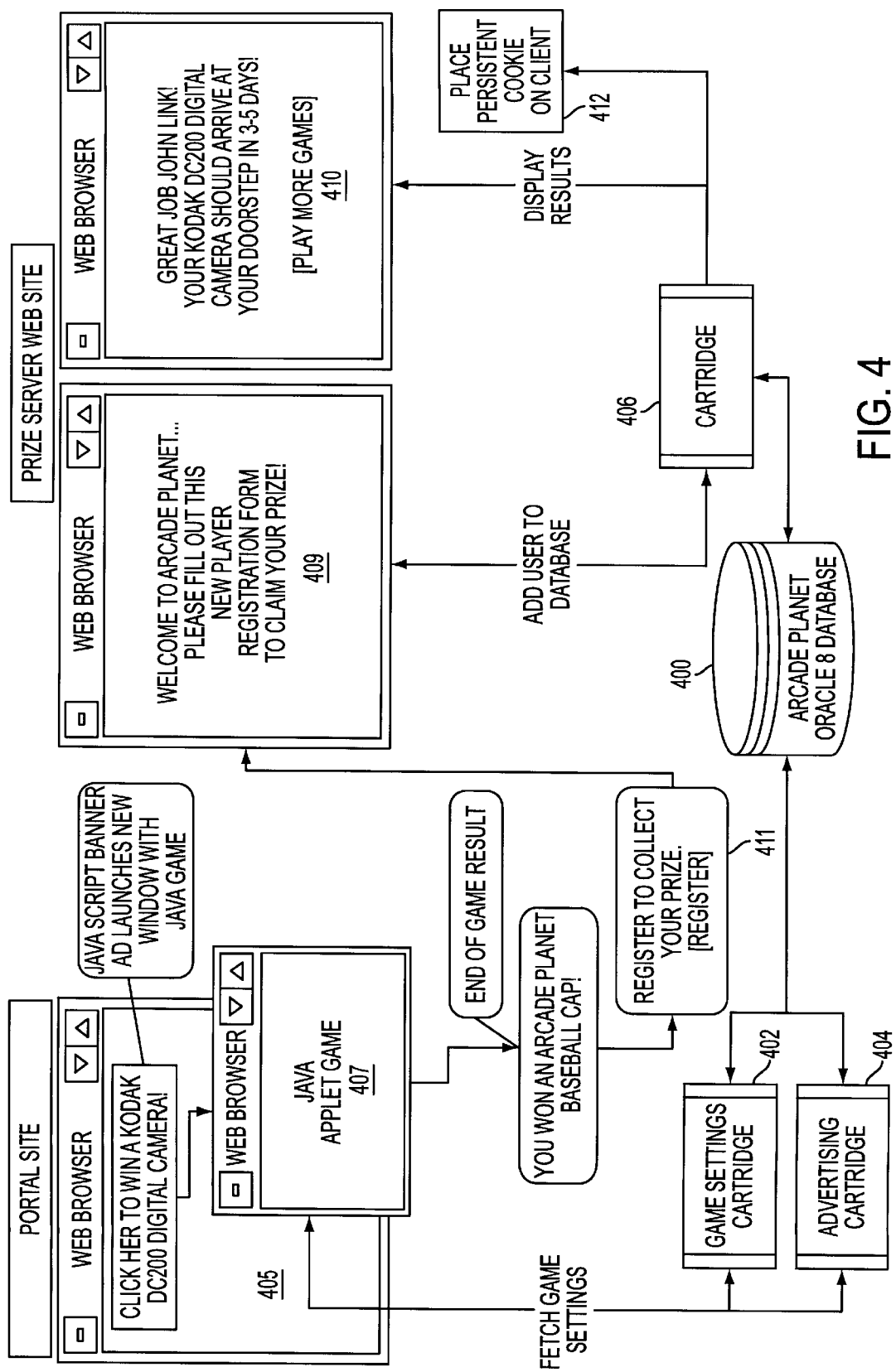
FIG. 4 is a functional diagram illustrating various interfaces accessed during the course of use of the present invention in addition to underlying supporting components of such interfaces.

FIG. 4 illustrates a functional diagram illustrating some of the user interfaces, supporting software, and hardware associated with an alteration of the flowchart in FIG. 3. In terms of hardware, a server 400 is shown to include software having a game settings cartridge 402, an advertising cartridge 404, and a prize redemption cartridge 406. It should be understood that any of the foregoing cartridges may be executed from separate servers.

In use, a user interface 405, i.e. web page, of a hosting web site allows access to a game interface 407 via the game settings cartridge 402 of the server 400. In contrast to operation 302 of the method of FIG. 3, the present alternate method does not require the user to log on or purchase credits. Instead, funding is afforded by advertising that is provided during the course of the game by way of the advertising cartridge 404. Upon winning a number of prize credits, the user is then forwarded to a prize redemption interface 409 governed by the prize redemption cartridge 406.

When access is gained to the prize redemption interface 409, the user is required to log on via a log-on interface 411, unless, of course, the user is already logged on. Thereafter, a confirmation interface 410 is displayed for indicating that the prize has been delivered. As an option, a "cookie" may be placed on the computer of the user in operation 412.

Figure 4A:
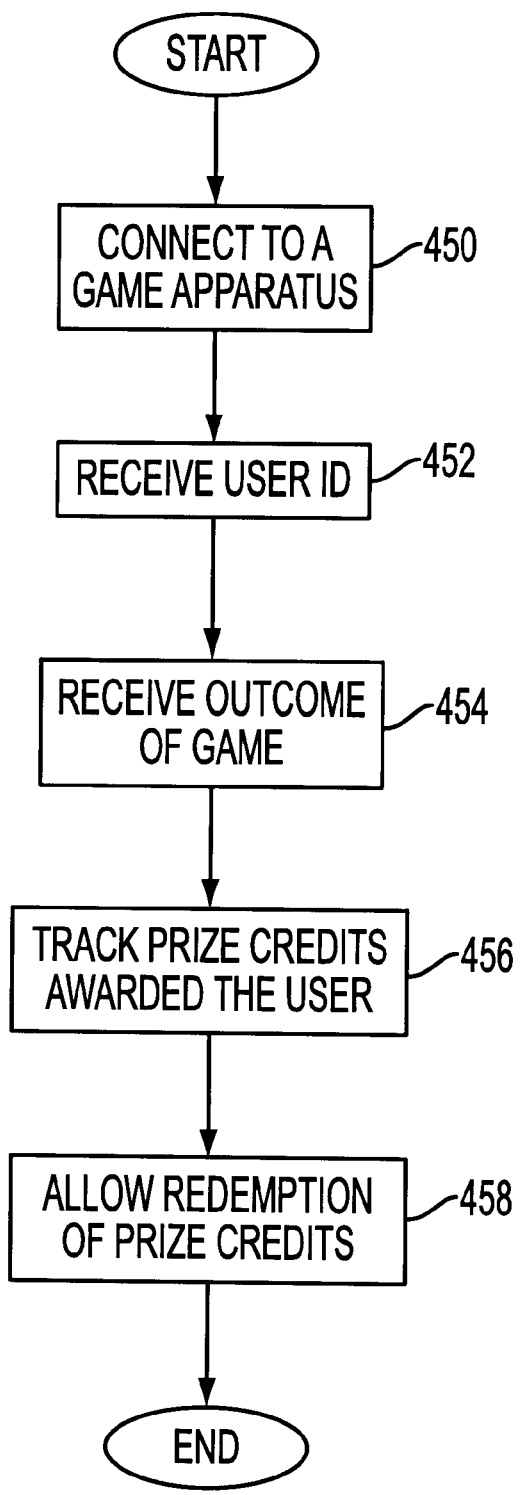
FIG. 4A is a functional diagram illustrating the operation of the prize database server of the present invention.

FIG. 4A is a general functional diagram illustrating the operation of the prize database server of the present invention. Irrespective of whether the present invention is implemented in the manner shown in FIG. 3 or FIG. 4, or any other manner, the prize database server may carry out fundamental operations. In particular, the prize database server is adapted for allowing redemption of prizes resulting from playing games on a plurality of networked game apparatuses.

To accomplish this, the prize database server is capable of connecting to the game apparatuses via a wide area network, i.e. the Internet, or any other communication system in operation 450. Upon the connection being established, the prize database server receives a user identification code from the game apparatuses that corresponds to the user in operation 452. Also received is an indication of an outcome of a game or games upon the user playing the game(s). Note operation 454. The prize database server also tracks a number of prize credits awarded the user based on the outcome of the game in addition to allowing redemption of the prize credits for a prize, as indicated in operations 456 and 458, respectively.

Figure 5:
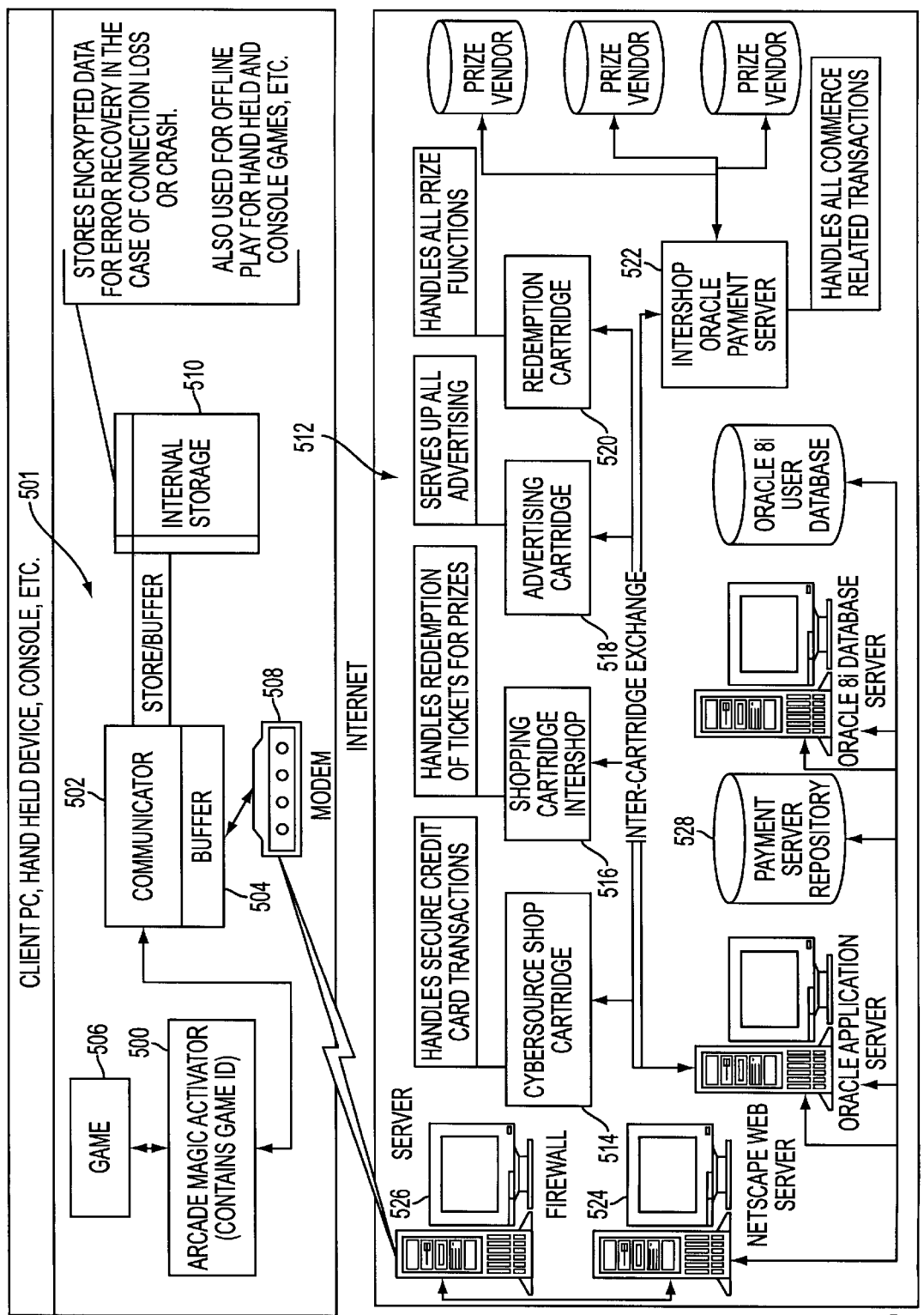
FIG. 5 is a schematic diagram illustrating various software components of one of the game apparatuses of the present invention and further multiple servers associated therewith.

FIG. 5 illustrates software that may be resident in one of the game apparatuses mentioned hereinabove. Client-side software 501 is shown to include an activator module 500, a communicator module 502, and a buffer module 504 which are adapted to interface with a game module 506, a modem 508, and internal storage 510 among other components of the game apparatus. Together, the foregoing software components constitute an application program interface (API) that may be accessed via a C++ dll for Win32 games and obfuscated Java class(es) for Java applet games.

Also shown is server-side software 512. The server-side software is shown to include a secure credit card transaction module 514, a shopping module 516, an advertising module 518, a redemption module 520, and a payment server 522 which may be interconnected with any of the game apparatuses via a web server 524 and an associated firewall 526. A plurality of supporting servers 528 may also be included per the desires of the user.

In order for the process of FIG. 3 to be effectively carried out, variables, or game settings, must be transmitted to the game apparatuses from the server and further identification codes and game outcomes must be transmitted to the server from the game apparatuses.

Examples of the game settings include a table of prize credits awarded in terms of various game outcomes possible on the game. For instance, 10 prize credits may be awarded for every 1000 points earned during play of the game. Yet another example of game settings may include the enabling or disabling of various features of the game based on the geographic location of the user as indicated by the identification code. It should be noted that the transmission of the identification codes and game outcomes to the game server is critical for tracking the prize credits awarded a user when prize redemption is desired. Further examples of game settings, identification codes, and other information that may be exchanged for various purposes will be set forth hereinafter in greater detail.

To accomplish the foregoing exchange of information, the activator module 500 is adapted to interface with the game module 506 and request information from the communicator module 502 as needed. At the time of each request, the activator module 500 identifies the game module 506 to the communicator module 502 for purposes that will soon become apparent later. As such, the activator module 500 is specifically tailored for use with the corresponding game. For security purposes, additional information relative to the game developer may be stored on the game server.

The communicator module 502 in turn make numerous calls for information from the server. Such calls are made over the modem. In order to accommodate situations where a connection can not be made with the game server or a connection is lost temporarily, various features are afforded. First, upon the receipt of information from the server resulting from a call, such information is stored in internal storage which may constitute any type of memory. As such, when a connection to the server can not be made, the game settings may be retrieved directly from the internal storage. Further, the communicator module 502 may be adapted to manually or automatically connect with the server periodically or on any other time frame for synchronization purposes.

Since the present invention may be used with many types of games and communication with the game server may some times be compromised, it is preferred that a minimum amount of calculations be performed on the game apparatus itself. Instead, information is received from the game apparatus by way of the API, calculated by the game server, and transmitted back to the game apparatus. Further, the communicator module 502 may be capable of requesting core assets from the game server for storage on the client computer. Such core assets may be used universally with any type of game and include universal graphics, playing cards, sound affects, mahjongg tiles, sound effects, graphics, etc. The core assets would only need to be downloaded once and may be updated, deleted or supplemented as needed.

The calls that may be executed by the API in order to communicate necessary information will now be discussed. Such function may actually include a plurality of URL-based calls. The calls may correctly format the data, connect to the server, send information to the game server using secure sockets layer (SSL) and then correctly format the return code and any data that was returned to it from the server. The communication layer is responsible for formatting parameters and for maintaining as many internal variables as possible. This shields the game module 506 from continuously having to pass the same parameters. The game module 506 is responsible, however, for appropriately handling return codes returned from the server.

Some examples of calls will now be set forth:
getGameSettings

This function takes a few different forms. First, if it is called from a Java applet game, then it is safe to assume the player is connected to a network, i.e. the Internet, in which case it is safe to retrieve game settings from the game server regardless if the game is being played in a demonstration (play-for-fun) mode or a pay-to-play mode. Any other kind of game requires default game settings to be used if in the demonstration mode. Any game in the pay-to-play mode assumes it is safe to query the server to get game settings. The data is specific to each game and is returned in the form of name-value pairs (e.g. "PointsLevel1=10"). The game apparatus is responsible for extracting the value for each known piece of data. This call is also used to validate the game version. Games are not allowed to continue if they are not the latest version. This helps to ensure reliable redemption play.
beginGame The present call may or may not be available in games played in the demonstration mode. With this call, the server is given the number of credits to be played and attempts to debit the player's account. Prior to doing so, however, the server determines whether the player has any specific business rules that prevent him from playing. When the player has been successfully validated and his account has been debited, the server adds a row to a table in a database indicating that he has started the game, and then returns the appropriate return code to the game apparatus.
endGame The present call may or may not be available in games played in the demonstration mode. The present call is sent to the prize database server to provide game data including end time and score. This data is used to update the database row that was added when the game was started. The score is fed into the points-to-prize credits conversion table to determine if any award should be given. The present call also prompts the prize credits in the player's account to be appropriately changed.
getNextInstaPrizes The present call may or may not be available in games played in the demonstration mode. The present call is sent to the prize database server to obtain a description and unique prize ID of the next specific prize. The redemption engine on the server generates this data. All next specific prizes are predetermined based on the previous prize and reside locally on the game apparatus. The server notes the prize ID in order to validate against the wonInstaPrize call.
wonInstaPrize The present call may or may not be available in games played in the demonstration mode. The present call is used when a specific prize is won at which time the prize ID of the specific prize is sent to the server for validation within the redemption cartridge. This effects at least one of three occurrences:

If game credits were won, such game credits are added to the account of the player.

If prize credits were won, such prize credits are added to the account of the player.

If merchandise has been won, such merchandise is added to the player's shopping cart. Procurement is delayed until the player checks-out.

getAvailableCredits

The present call may or may not be available in games played in the demonstration mode. In use, this call is used prior to each game as a way of displaying to the player a number of credits that are available.
canPlay The present call may or may not be available in games played in the demonstration mode. This call serves as a separate function to check business rules preventing game play (parental controls, bad account, available credit, etc.)
getAdvertisements This call may be available in the demonstration mode depending upon the game platform. The present call serves to retrieve the latest advertisements which are to be played. This may be accomplished by calling the advertisement in the form of an advertisement ID and checking to see if the appropriate advertisement has already been downloaded. If the appropriate advertisement has not already been downloaded, default advertisements are used that were downloaded previously during which downloading begins to obtain the latest advertisements while the player is playing the game or browsing a related site.
postGameStatus The present call sets a persistent game state in the event of a failure of the game apparatus, connection loss, etc.
getGameStatus This call gets the persistent data (see postGameStatus) from the game apparatus.
getErrors The present call retrieves any error information that was generated during use of the game apparatus.

In terms of security, the various variables that are passed may be named in a counter-intuitive, obfuscated manner. For example, a variable relating to a personal identification code may be named "prize_credits_awarded." Further, digital signing may be employed where feasible. Even if security is breached, the present invention inherently prevents significant fraud since the value of prize credits awarded is always a fraction of the value of game credits required to play the game. In addition to the foregoing features, when requests start flooding the server from one particular location, the present invention may lock out all future requests from that location.

Figure 6:
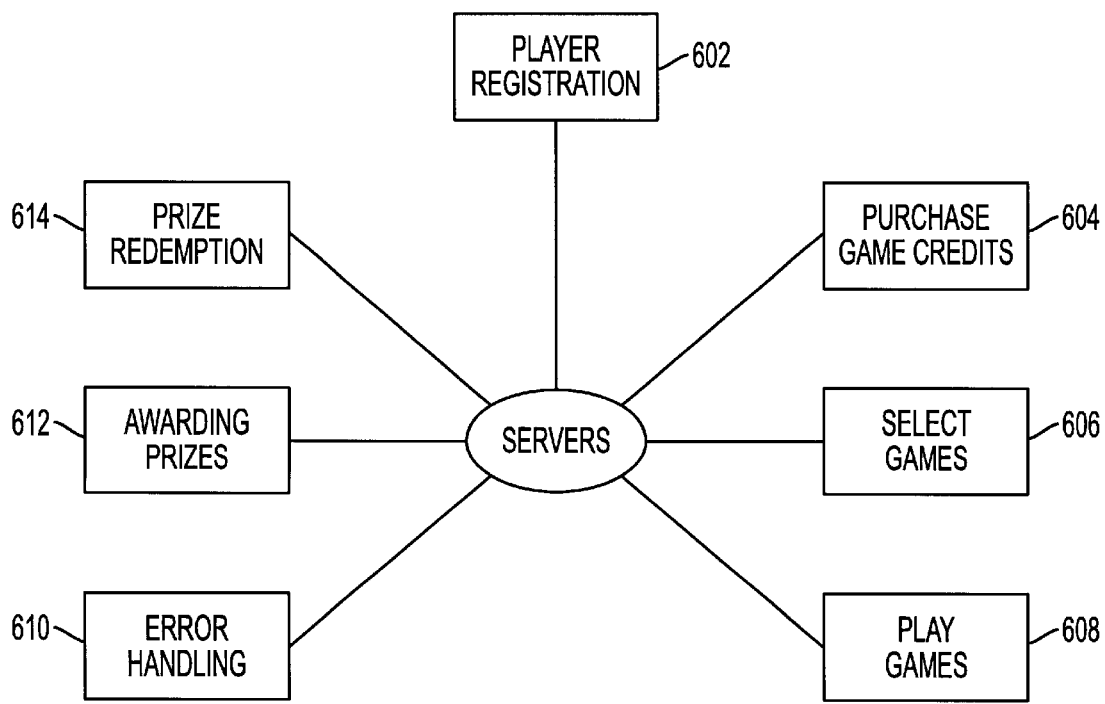
FIG. 6 is a flowchart illustrating various operations associated with the present invention.

FIG. 6 illustrates a functional diagram showing the various aspects of the method associated with use of the present invention. The various operations shown in the functional diagram of FIG. 6 include a player registration operation 602, a purchase game credits operation 604, a select game operation 606, a play game operation 608, an error handling operation 610, an award prizes operation 612, and a prize redemption operation 614. It should be noted that the foregoing functional aspects of the present invention may be carried out in any order or not at all.

For example, in demonstration mode, the purchase game credits operation 604 is not necessary and the awarding prizes and prize redemption operations 612 and 614 are optional. Further, the player registration operation 602 is only necessary if the prize redemption operation 614 is executed. Still yet, the select games operation 606 is required only if multiple games exist and the error handling operation 610 is optional.

Figure 7:
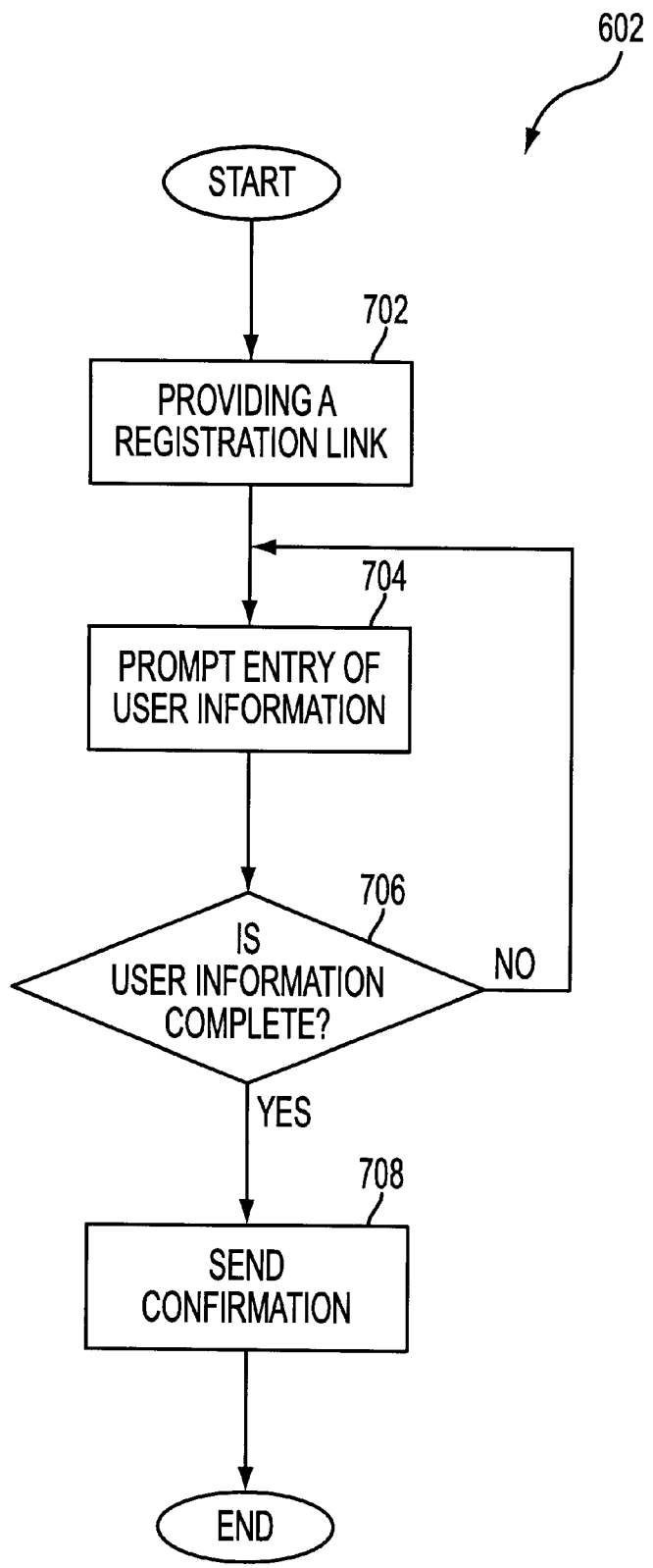
FIG. 7 illustrates the process of the present invention by which the player registration operation 602 of FIG. 6 is executed.

FIG. 7 illustrates the process of the present invention by which the player registration operation 602 of FIG. 6 is carried out. Player registration may be executed at any time by the prize database server or not at all in some embodiments where a game is being played in demonstration mode. In one embodiment, player registration is required only upon redemption of prize credits for prizes. In such embodiment, the registration process makes it clear that in the event the user does not register, the user forfeits any prize credits that have been won.

When registration is required, unregistered players are provided a registration link in operation 702. Such link effects the display of an interface such as a web page which prompts the user to create a personal user name, or user identification code, and a password. Note operation 704. Further, the registration interface requires entry of minimal necessary information such as a name and an e-mail address. Optional information such as demographics, game preferences, etc. may also be entered if desired by the user. It is then determined if the necessary information has been entered and is complete in decision 706. Upon entry of at least the necessary information, a confirmation may be sent to the user in operation 708.

At anytime, the user may update any of the foregoing profile information. As an option, the user may be precluded from altering the user identification code for security purposes. As a further option, a hint may be provided in order to facilitate remembering the user identification code and/or the password.

In one embodiment, a person registering, or a primary account holder, may establish a plurality of secondary accounts for secondary account holders. Such feature allows a parent to assume a primary account holder role and control various aspects of the secondary account holders who may include children of the parent. Examples of aspects which may be varied independently or simultaneously for each player include a duration or specific range of time a secondary account holder may play games, a dollar amount of game credits that can be purchased in a specified amount of time, and/or the types of games that may be played. The control of the type of game permitted to be played may be based on a current game industries rating system.

In addition to limiting the ability of the secondary account holders to use the present invention, the primary account holders are also given exclusive authority to modify and/or delete a current account, and transfer game credits, prize credits, and prizes to and from the various secondary accounts. This allows pooling of prize credits for obtaining desired prizes, etc. In order to add secondary accounts, a primary account holder may be required to enter at least one valid credit card number as a way to establish eligibility. It should be noted that a credit card may not be used to create two separate main accounts during use of the present invention. Further, game credits, prize credits, and prizes may not be transferred between main account holders to inhibit fraud.

Figure 8:
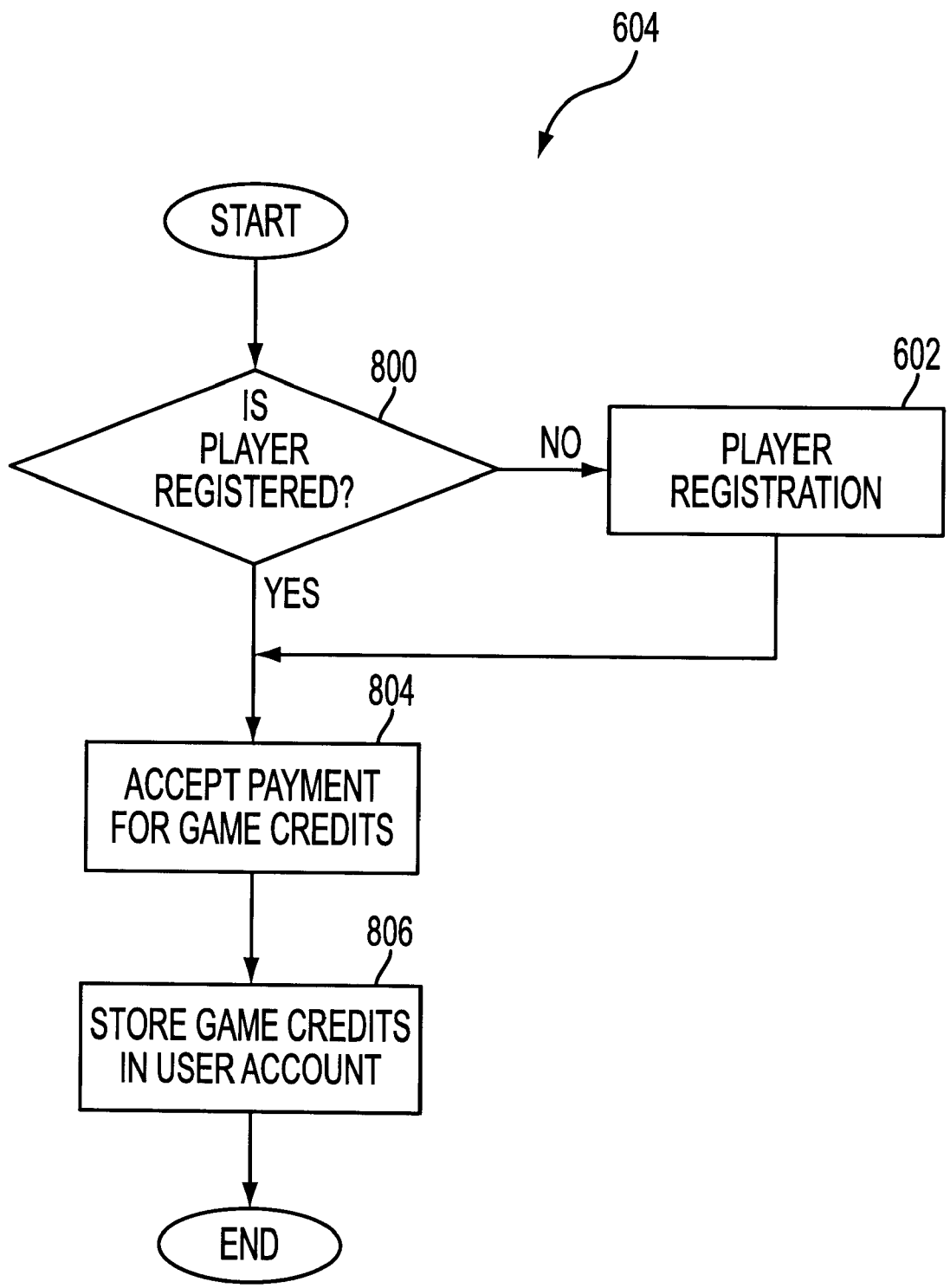
FIG. 8 illustrates the process of the present invention by which the purchase game credits operation 604 of FIG. 6 is executed.

FIG. 8 illustrates the process of the present invention by which the purchase game credits operation 604 of FIG. 6 is carried out. Such game credits are used to play games in order to win prize credits. It should be noted that in some embodiments, purchase of game credits is unnecessary due to the presence of advertisements or because the game is merely being played in a demonstration mode.

The process of FIG. 8 begins by determining whether the player is registered in decision 800. If not, the player registration operation 602 (see FIG. 7) is executed. Once it is ascertained that registration is complete, the purchase of the game credits is permitted in operation 804.

Upon purchase, the game credits are automatically stored under the corresponding account in operation 806. The system may have the capability to provide a non-linear purchasing scale, giving players incentives to purchase larger quantities of credits at a lower per unit cost. For example, when purchasing credits the player might be offered 10 game credits for $1.00, 30 game credits for $2.50, 60 game credits for $4.75, and 120 games for $8.50.

While the prize database server handles all of dollar-to-game credit conversion, the conversion factors may be also dictated by managers of the game apparatuses. When a player makes a purchase request, the prize database server validates the account and check business rules to verify that the user is qualified to make the purchase. In the event that a user is either restricted by parental controls or his or her account has been flagged, the user may be notified of such with the appropriate messages on how to correct the situation, i.e. contacting support personnel.

The prize database server may also be designed to support "incentive suppliers." Entities which desire to provide free game plays to their customers may present various customers with a URL and a key code to be able to use a predetermined amount of game credits. The customer, or user, would then go to the URL, enter the key code, and receive a predetermined number of free game credits. In the present embodiment, the incentive supplier would be responsible for all costs related to the key codes that are distributed.

In operation 606 of FIG. 6, a selection of a game to be played occurs. Two optional types of games that are available include games played in exchange for payment and free games including games played in a demonstration mode. The payment games require the prior execution of operations 602 and 604 of FIG. 6. In the case of free games, however, player registration in operation 602 may be delayed until prize redemption is required.

The free games may include games supported by Java Applets, ShockWave, Flash, etc. without communication of identification codes or the like. Further free games may be created to entice users to register with the prize database server. It should be noted that free games may award only a limited amount of prize credits, if any. As an option, the free games may only simulate winning. In any case, the user may be required to register before a prize is redeemable after which future prize credits awarded to the registered use may be limited or prevented. Further, the free games may be supported by advertising.

Payment games may be supported by Java Applets, ShockWave, Flash, Windows95/98/2000, macros, etc. It is imperative that it is understood that payment games may include any type of advertising-supported game or a game that is supported by any type of compensation scheme. In one embodiment, the payment games may be played in a tournament mode. Ideally, tournament games present all tournament players with the same exact game settings so that all players have the same odds. In one type of tournament game, a duration-type game, a variable number of games are to be played in a fixed amount of time.

In each of the previous embodiments, the games may include a "game of skill" that requires a predetermined goal, task, or objective for a game to be accomplished in a skillful manner such that an outcome of the game is determined primarily by the amount of skill of the player. The greater the player's skill, the closer or more easily a desired goal in the game can be reached by the player. Points associated with the predetermined goals or objectives can be added to a game score such that a higher game score, on average, indicates a greater amount of skill by the player. In the alternative, the games may include a "game of chance" where the outcome of the game is determined primarily on chance. It should be noted that games of chance may be restricted based on an age of the user and/or a geographic location where the user resides.

Figure 9:
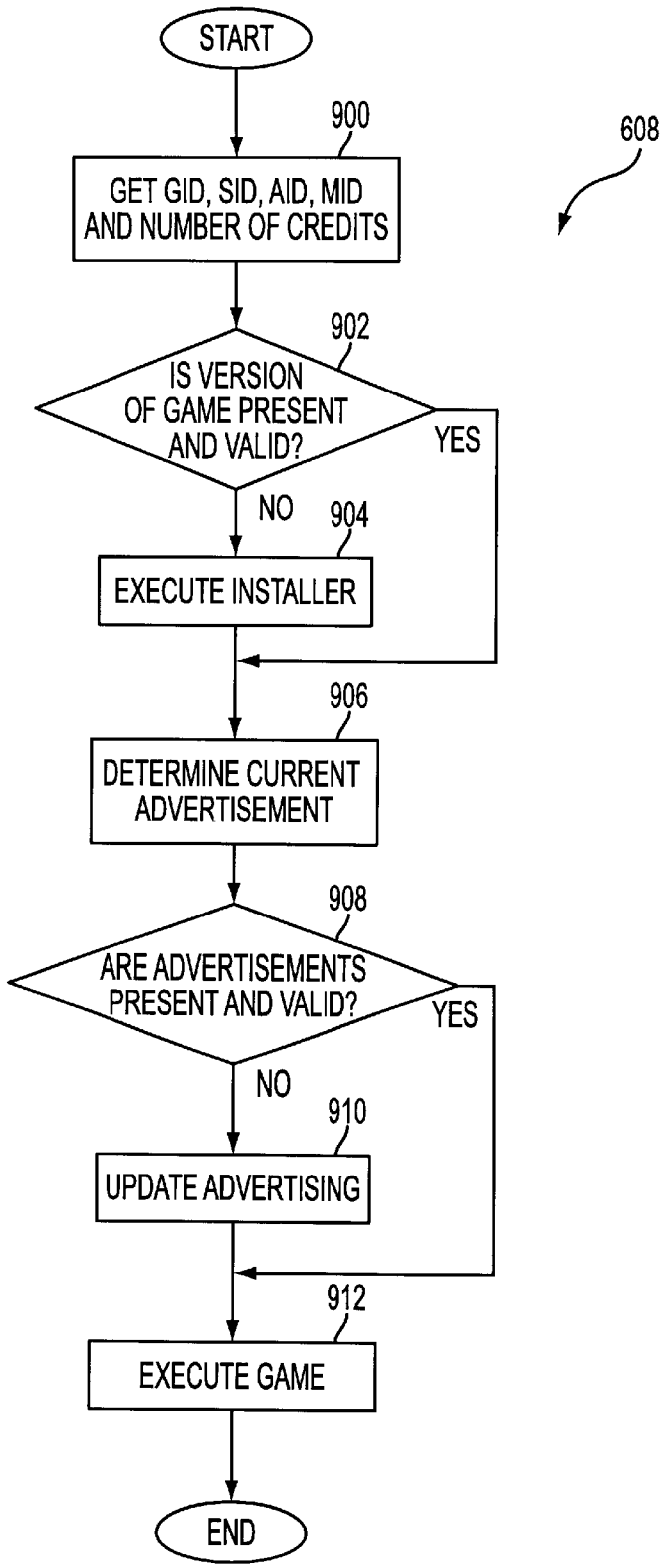
FIG. 9 illustrates the process of the present invention by which the play games operation 608 of FIG. 6 is executed.

FIG. 9 illustrates the process of the present invention by which the play games operation 608 of FIG. 6 is carried out. As shown, the prize database server is adapted for receiving a plurality of identification codes in operation 900. For example, a site code may be receive which is representative of a web site, or game apparatus, which is supporting a game. In addition to the site identification code, a game identification code, a user identification code, a prize credit identification code, a mode identification code, or any other type of identifier may be received by the prize database server.

As an option, the prize or any other feature associated with the present invention may be determined based on any of the foregoing identification codes. Further, other aspects of the present invention may be specifically tailored for a particular profile. For example, the cost of game credits, a prize, a name, a number or value of the prize credits awarded, advertising, sounds, graphics, and/or limited access may be altered based on any of the aforementioned identifiers. In each of the foregoing cases, such tailored aspects may be handled by the game server.

One objective of the use of identifiers is to allow for partnerships, especially between the prize database server and other game servers. One game server, for example, may allow all its players to play a specific game for free thus modifying the value of credits, but only for that particular site. Accordingly, each game server may have settings specific to that site and thus when a player launches a game, the prize database server must know the originating location of the game in order to return the appropriate game settings. In addition, players will be able to register with the prize database server at partner game servers, or sites. Further, the interfaces provided by the prize database server may be modified in accordance with the interface of the partner game servers. This creates the perception that a user is still interfacing with the partner game server when actually he or she is interfacing with the prize database server. As an option, activity for all players may be maintained for each of the game servers as a way to track site traffic and thus be able to pay commissions of the game credits revenue, sale advertising, and collect advertising revenue.

In addition to facilitating partnerships, the identifiers may be used to control the experiences of particular users. As mentioned earlier, an age of the user or account status, i.e. secondary account holder, may affect the user's ability to perform various functions of the present invention. Further, the user identification code may be used to indicate a location of the user. This may be accomplished by referencing registration information of the user or tracking an IP address by which the user has gained access to the server. Given the identity of such geographic location, the present invention may preclude access to certain games in accordance with local jurisdiction laws. This may be particularly beneficial in the case of "games of chance" as discussed hereinabove. It should be noted that alternate game settings may be changed for each particular jurisdiction.

Upon the receipt of the identification codes, it is then determined in decision 902 whether a current version of the game is present and valid. If the current version is unacceptable, an installer may be executed in operation 904. Such installer may be downloaded from the prize database server and subsequently executed on the game apparatus.

When it is verified that the current version of the game on the game apparatus is valid, advertisement software may be executed. Prior to execution, however, the advertisement software may be identified in operation 906 after which it is determined in decision 908 whether a version of the advertisement software is present and valid. If not, the advertisement is updated in operation 910 by downloading, etc. Finally, the game is executed in operation 912.

Advertising software may be executed between or during games. Such advertisements can include still shots, animation, movies, sound, etc. Advertisements sponsored by companies, prize providers, game providers, or other sources can be displayed and, in another aspect of the present invention, can be directly related to prize or game information. For example, a sponsor may have contributed to prizes available to players on the advertising game apparatus, so that the advertisement has a direct relation to prizes and can thus increase the effectiveness of such advertising. A sponsor might also supply free games for players in exchange for displaying advertisements, or may simply pay the game or prize database server for advertising time. Still yet, a player can play an advertiser-sponsored game and directly win an advertiser's prize if a task is accomplished. Thus, using the linked advertising and prize redemption system disclosed herein, multiple revenue streams from advertisers are offered to a game operator and also offer the sponsors more effective advertising.

Figure 10:
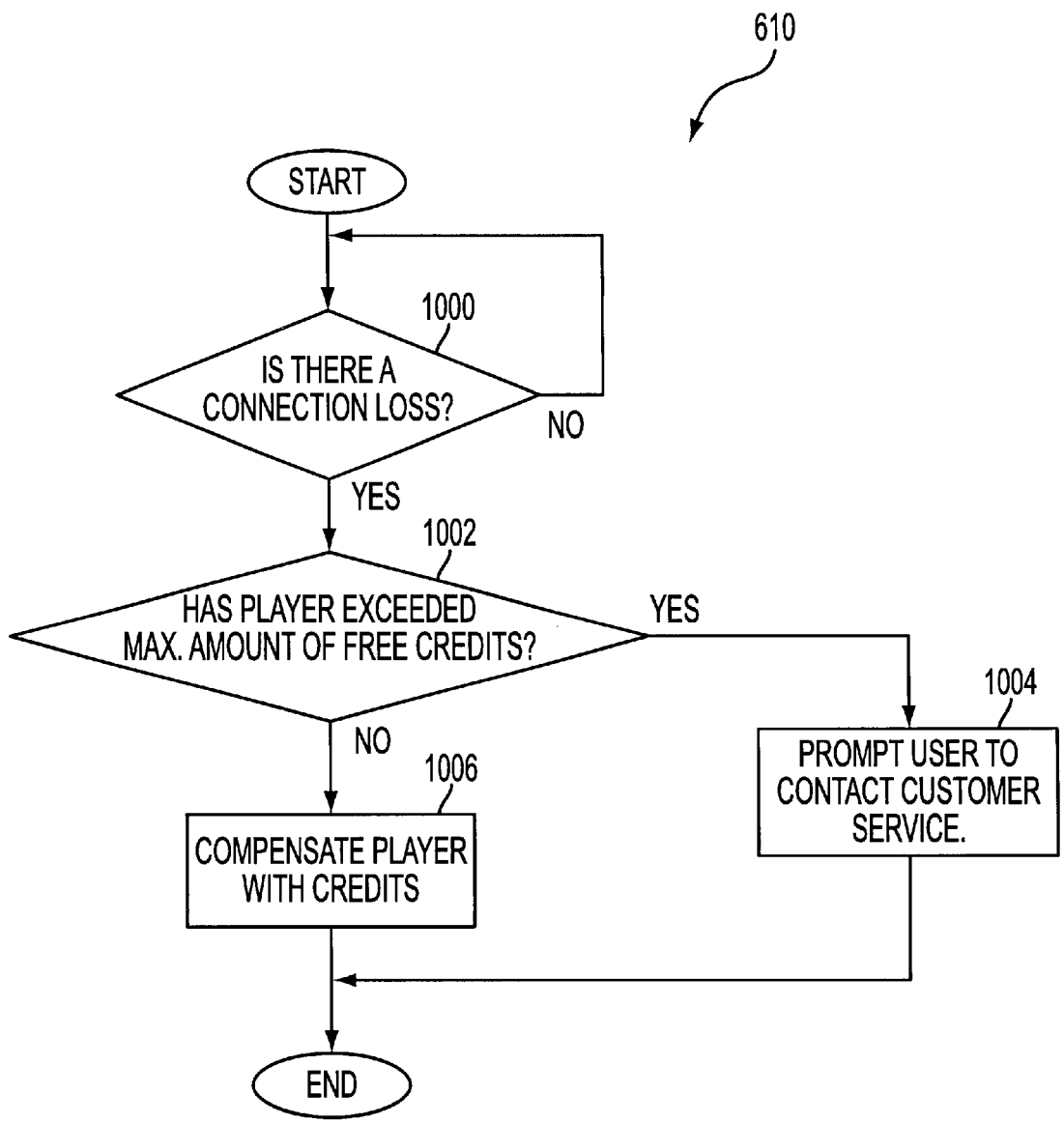
FIG. 10 illustrates the process of the present invention by which the error handling operation 610 of FIG. 6 is executed.

FIG. 10 illustrates the process of the present invention by which the error handling operation 610 of FIG. 6 is carried out. Error handling is executed upon a loss of connection between the prize database server and the desktop or laptop computer, as determined by decision 1000. If a loss of connection is detected, the game parameters in the prize database server will not have had the chance to be updated at game end-time. As such, in order to compensate the user, a predetermined number of game or prize credits may be awarded to the user in operation 1006.

Since awarding game or prize credits in response to connection loss may provide an incentive for intended connection loss during game play, certain precautions are necessary. In one embodiment, a method may be implemented for tracking players who regularly 'drop' connections. The software on the game apparatus, i.e. the communicator module, may try to solve the problem when communication is re-established, but if it cannot fix the problem, the player may be given the opportunity to play the game again for free as long as they have not exceeded a predetermined maximum number of free game or prize credits. Such predetermined maximum number of free games may be established in predetermined time intervals, i.e. 10 credits/month, to limit the negative affects of fraud.

In the event that a user has exceeded the predetermined maximum number of free games in decision 1002, the user may be notified and given a customer service number to call in operation 1004. Customer service will have the ability to give the user some more credits on a discretionary basis. Once connection has been reestablished, the communicator module will update the server with any data cached prior to the connection loss.

In the awarding prizes operation 612 of FIG. 6, prizes of various types may be awarded. The term "prize", as used herein, is intended to generically refer to any merchandise, souvenir, food item, game credits or other physical goods or services which can be offered to players of redemption games and which may have value other than as a medium of exchange for use in the gaming environment. A radio, stuffed animal, toy model, coupon for monetary value outside the gaming environment, gift certificate, cash, and free games to be played on game apparatus are all examples of "prizes." A prize might also be a promotional coupon or cash prizes, which can encourage players to return to the current gaming environment more quickly in the future.

"Prize credits" differ from a "prize" since they can be used to redeem other types of prizes. In one embodiment, the prize credits that are awarded represent a type of universal currency that may be used for prize redemption purposes. In use, prizes may be made available for various amounts of the universal prize credits.

The amount of prize credits awarded to the player may be based upon a game score or other result of a game process. In addition, special or progressive goals may be achieved by the player to win an additional or specified number of universal prize credits. In the preferred embodiment of the redemption system, "prize credits" are used as a medium of conversion from game score to prize value.

As an option, specific prize credits may be awarded which may be redeemed for specific prizes awarded to the user. Specific prize credits are to be distinguished from the universal credits described above. A "specific prize" or "instant prize," as referred to herein, is a particular prize or type of prize that a player can be directly and immediately awarded and, in most cases, can immediately receive due to a particular winning result on a game apparatus. A "specific prize credit," as referred to herein, is thus an electronic voucher that can be exchanged for the specific prize only.

The prize credits, as described hereinabove, may be awarded by any one of various methods. In the case of the specific prize credit, the same may be downloaded prior to beginning play of the game. This prevents complications if a connection with the prize database server is lost during play. Further, such feature allows the player to know the prize(s) at stake prior to play for legal purposes, and also allows the specific prize credit to be immediately displayed upon being awarded without delay due to downloading. As an option, the specific prize credit may even be displayed during play prior to being awarded for enticement purposes.

In another embodiment, an ordered list of specific prize credits may be displayed during play. Ideally, such list of specific prize credits may be generated based on business rules on a periodic, i.e. 24 hours, basis. Such business rules may include a current total number of specific prize credits a current player has been rewarded in the past, a desired payout percentage, a current average number of game credits that the current player spends per game, a current total number of specific prize credits available, and a value of game credit. It should be noted that the foregoing business rules may vary based on other factors such as a web site through which the game was accessed, a profile of the player, etc. If such information is not available for any reason, the present invention may employ default values to generate the appropriate specific prize credits. Additional information on such business rules may be had by reference to U.S. Pat. No. 5,292,127, by Kelly et al. which is incorporated herein by reference.

In yet another embodiment, a "frenzy" is afforded by listing a plurality of specific prize credits along with a current number of such specific prize credits that are remaining, or have not yet been awarded. Rules governing how the specific prize credits are awarded in the present mode are similar to those discussed previously. However, the types and number of specific prize credits awarded are predetermined. It should be noted that when the quantity of any given specific prize credits reaches zero, such specific prize credit may remain on the list but will graphically indicate that it is no longer available.

As an option, the previous embodiment may be modified by increasing the variety and/or number of specific prize credits under certain circumstances. This number may be increased based on the amount of times a particular game is played, the number of times that different games are played, or by achieving a game-related goal, thus affording a "frenzy"-type situation.

In still yet another embodiment, the prize credits may be awarded in a "progressive" manner. In such embodiment, each user contributes to a collective progressive pool. The progressive pool, for example, can be incremented with every game credit spent on any game apparatus, incremented based on an amount of advertisement impressions that are served(ideal for when advertiser is paying or supporting the progressive score), automatically incremented over time at regular or random intervals, manually incremented by an operator of the prize database server, calculated in real-time, etc. The progressive pool is accumulated from the current and previous games that have been played on any linked game apparatus. In one embodiment, the increment rate of the progressive pool can be determined independent of the number of players playing or advertisements viewed.

The first player that achieves a predetermined progressive goal on any of the linked game apparatuses wins the progressive prize credits pool, where the progressive amount of prize credits is added to that player's prize credits count. It should be noted that a progressive bonus number of prize credits may also be awarded in lieu of a bonus score, thereby avoiding the need for conversion. Once the progressive bonus score is won, the process is restarted at a default value for continued play. Progressive goals, scores, and bonus apparatuses are described in additional detail in U.S. Pat. 5,292,127, by Kelly et al. which is hereby incorporated by reference herein in its entirety.

Figure 11:
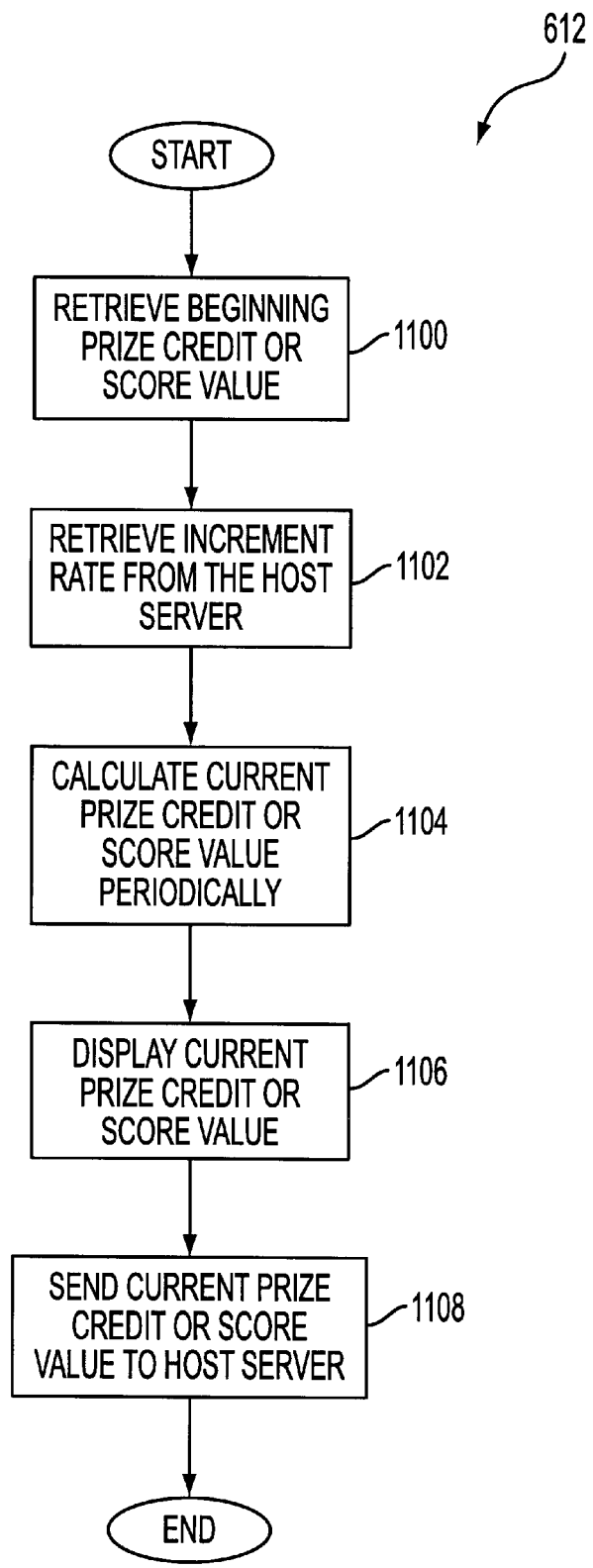
FIG. 11 illustrates the process of the present invention by which the awarding prizes operation 612 of FIG. 6 is executed.

FIG. 11 illustrates the process of the present invention by which the awarding prizes operation 612 of FIG. 6 is carried out in order to contend with the possibility of losing a connection with the prize database server. Specifically, FIG. 11 illustrates the process associated with awarding a progressive score or prize credit amount.

As shown in FIG. 11, prior to the beginning of each game, information including a current progressive prize credit or score amount is retrieved along with a current predetermined increment rate from the server in operations 1100 and 1102. During use, the progressive prize credit or score amount is periodically incremented at the increment rate in operation 1104 for the duration of the game.

During the course of the game, the current prize credit or score amount may be displayed, as indicated in operation 1106. If the player achieves the high score or some other related goal, all of the current progressive prize pool or score amount is awarded the user. At the end of the game in operation 1108, information including the current prize credit or score amount is sent to a host server for redemption purposes. By downloading both an increment rate and a progressive prize credit or score amount, communication with the server need only be established once at the beginning of the game.

In one embodiment, a particular method may be used to calculate a dynamic progressive score increment rate during the course of the game. In such embodiment, a calculation is made periodically to determine the current increment rate which is, in turn, used to calculate the current progressive pool that is to be displayed. In one embodiment, such calculation may be carried out every 2 minutes. It should be noted that the increment rate reflects the amount of time required for the progressive prize credit pool to be incremented by one prize credit, e.g., a prize credit is incremented every 1.824 seconds.

To calculate the current increment rate, a current total number of games played is first determined. The current total number of games increments each time a game is begun at a certain site on the network and in a certain mode, i.e. progressive mode, tournament, etc. Next, a previous total number of games is subtracted from the current total number which, of course, will be larger. The previous total number of games is the total number of games that was retrieved when the increment rate was last calculated. Thereafter, a difference between the current total number of games played and the previous total number of games played is multiplied by a prize credit fraction that determines a desired pay-out of the progressive game, thus rendering a prize credit increment product.

Next, an amount of time that has elapsed since the last calculation of the increment rate is determined by subtracting a last counter read time from a current time. This elapsed time is then converted into milliseconds and divided by the prize credit increment product. This renders the current increment rate.

In another embodiment, a client computer may store a time when the player achieves the high score or other related goal. Subsequently, upon reconnection with the host server, information including such time may be communicated thereto. This time may then be used in conjunction with tables on the host server that have different progressive scores based on different times and dates. For example, as time progresses from a designated start time of the progressive scoring, the amount of the awarded progressive score increases.

Further information including a cap or maximum progressive score may be retrieved from the host server prior to the game or any other time to prevent such score from exceeding a predetermined amount. In the alternative, such information may be stored and utilized on the host server. These features aid in preventing fraudulent activity.

As an option, the games may be played in a tournament-type fashion. During tournament play, various user may play against each other. To ensure fairness, various aspects of the games played may be maintained constant. For example, in the case of card games, the electronic virtual playing deck may be made to deliver similar results in the games of each of the players. To enhance tournament play, top scores of tournament players may be tracked over a period of time for the purpose of awarding a particular prize pool or a portion thereof to the highest score, etc. More information on tournament play may be had by reference to U.S. Pat. No. 5,292,127, by Kelly et al. which is hereby incorporated by reference herein in its entirety.

Figure 11A:
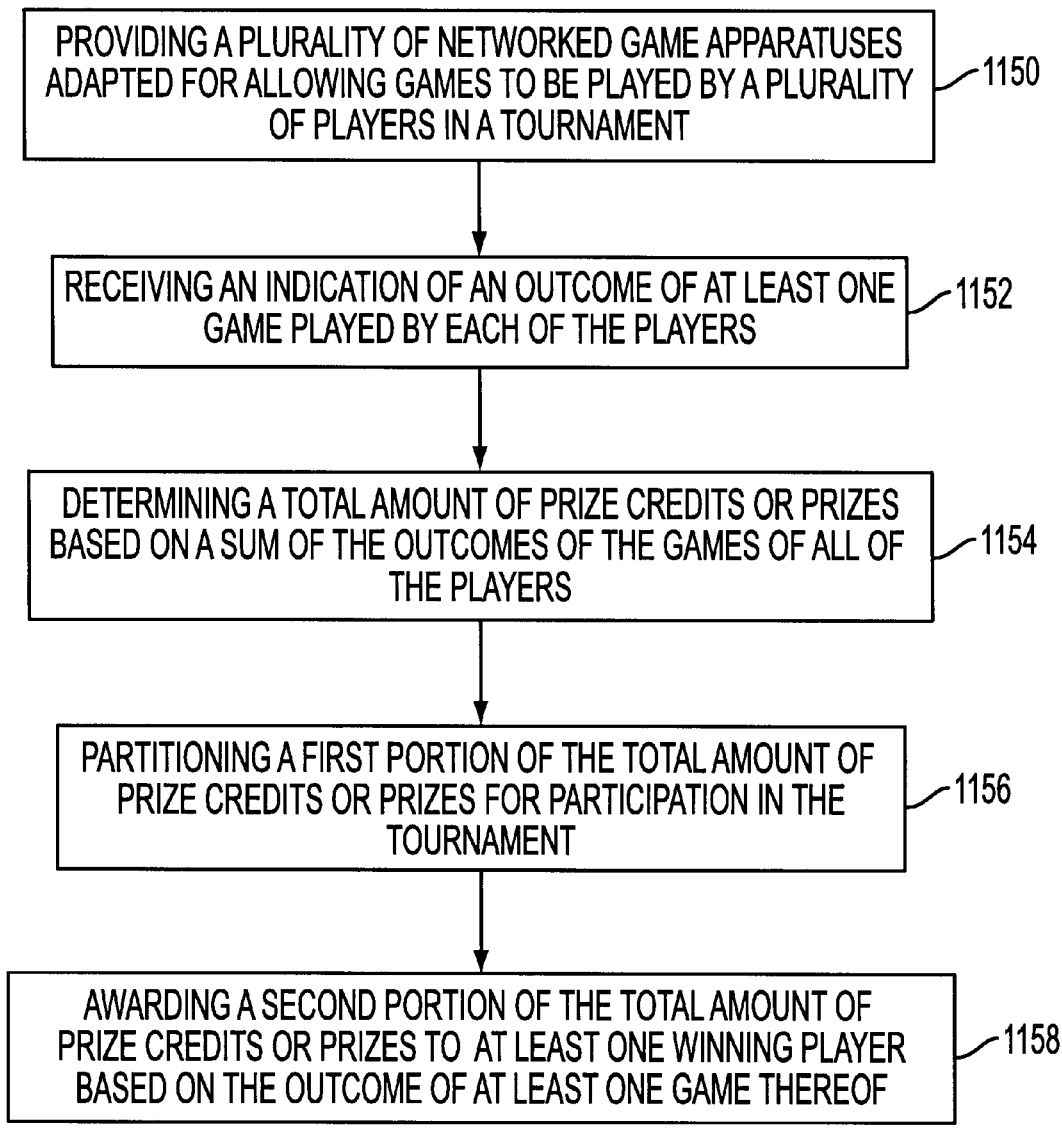
FIG. 11A illustrates a method of the present invention for determining payment for participating in a network gaming tournament.

FIG. 11A illustrates a method of the present invention for determining payment for participating in a network gaming tournament. As shown, a plurality of networked game apparatuses are first provided in operation 1150 for allowing games to be played by a plurality of players in a tournament. Such game apparatuses allow the play of games in exchange for game credits, or rely on funding provided by advertisers or the like.

After the play of game(s) during a tournament, an indication of an outcome, i.e. score, of at least one game played by each of the players is then received in operation 1152. Such outcome may be manually sent by the player, or automatically sent. Based on a sum of the outcomes of the games of all of the players, a total amount of prize credits or prizes is determined in operation 1154. It should be noted that the game apparatuses are already equipped with the ability to convert between outcomes of the games and a number of appropriate prize credits or prizes. Such ability is necessary for the games to be played during non-tournament play.

Subsequently, a first portion of the total amount of prize credits or prizes is partitioned for payment for participation in the tournament, and a second portion of the total amount of prize credits or prizes is awarded to one or more winning players based on the outcome of the at least one game thereof. Note operations 1156 and 1158. As an option, a first predetermined part of the second portion may be allocated for a first winner, a second predetermined part of the second portion may be allocated for a second winner, and so on.

In one embodiment, at least one winning player may be indicated on a list accessible on a site on the network. Such list may be updated upon receiving an indication of an outcome of at least one game played by another one of the players. This process may continue until all of the outcomes are received. As an option, a notice may be sent to at least one player each time the list is updated. Such notice, i.e. e-mail, may be given only to those players whose winnings are affected, or anybody desired.

In another embodiment, the total amount of prize credits or prizes may be determined by receiving a total sum of outcomes of the games for each of the players. Such total sum may then be divided by a number of the games played by each player. Such process renders an average outcome value per game for each player. The total amount of prize credits or prizes may be then determined based on a sum of the average values of the players. For additional incentive purposes, each of the players may be awarded a predetermined number of prize credits or prizes irrespective of an outcome of the games.

It should be noted that the game experience of each of the players may be set to be the same. Further, the network gaming system may tailor the experience upon each game. In a trivia game example, the network gaming system may track each time a tournament trivia game is played. Thereafter, each consecutive time the trivia game is played, a different line of questions may be provided. In operation, all players in the tournament may be given the same set of questions depending on whether it is their first, second, third, etc. entry. After the database of questions is exhausted, the questions may be "wrapped back" around to the first set of questions.

Figure 12:
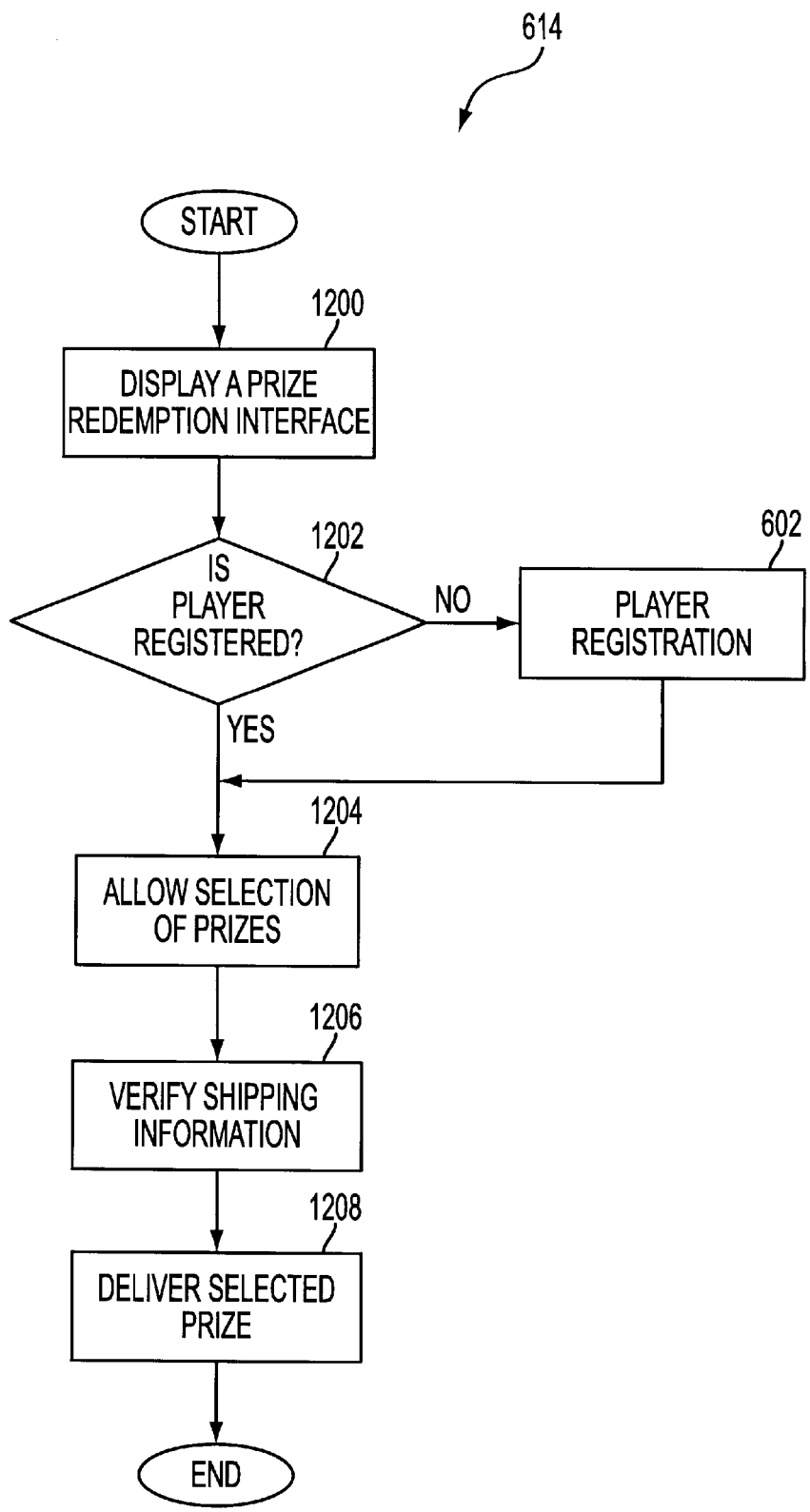
FIG. 12 illustrates the process of the present invention by which the awarding prizes operation 614 of FIG. 6 is executed.

FIG. 12 illustrates the process of the present invention by which the prize redemption operation 614 of FIG. 6 is carried out. In order to accomplish this, the prize database server is adapted for displaying at least one prize redemption interface page in operation 1200 to allow redemption of the prize credits. As an option, the user interface of the game apparatuses may include a link to the prize redemption interface page of the prize database server.

Once the prize redemption interface page, or "shopping center", has been accessed, the user is required to register in operation 602 (see FIG. 7) if it is determined that he or she is not already registered in decision 1202. After an identity of the user is verified, selection of a desired prize may be executed in operation 1204. In the case where the prize credit is a specific prize credit which corresponds with an undesired prize, the user may have the option of replacing the specific prize credit with universal prize credits. Upon selection of the desired prize, shipping information may be verified in operation 1206. Subsequently, the prize may be delivered by any capable means and the account of the user may be adjusted to reflect the current available prize credits accordingly. Note operation 1208. It should be noted that user registration may not be required for merely browsing the prize redemption interface page.

In an alternate embodiment, a user may elect for the prize database server to automatically deliver a prize corresponding to any specific prize credit awarded. In such case, the prize database server may use the player's default account settings for shipping. During the course of delivery, the users may receive emails indicating that a delivery has been confirmed and also when the prize is to be shipped. As an option, the user may be notified of a back-order.

In addition to the foregoing capabilities, the prize redemption interface page and prize database server may include a virtual shopping cart function, a checkout capability, shipping address modification module, etc. If the virtual shopping cart function is employed, any specific prize credit that is awarded may be immediately deposited therein. At any desired time, prizes depicted on the prize redemption interface page may be added and removed. Optionally, the prize redemption interface page may display advertisements, notification of specials, legal disclaimers, etc.

Figure 13:
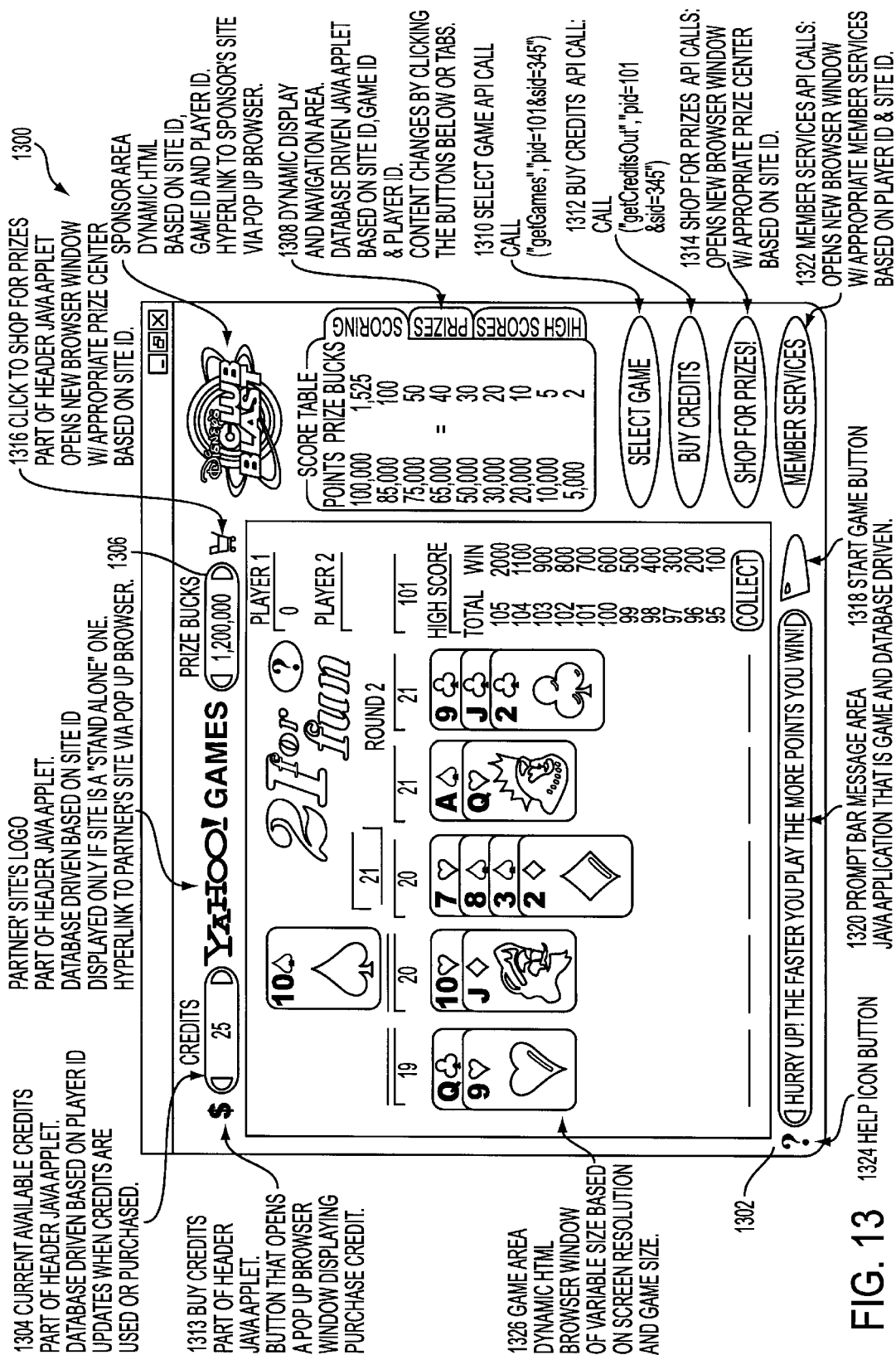
FIG. 13 is an illustration of a graphical user interface of the present invention.

FIG. 13 is a graphical user interface 1300 for allowing play of a game that is "prize-enabled" in accordance with the present invention. As shown, a frame 1302 is shown to include a first display 1304 for depicting a current amount of available credits of a particular user based on the user identification code. A second display 1306 is provided for depicting a number of prize credits that are currently awarded to the user. Also positioned on the frame 1302 is a third display 1308 for indicating either a point-to-prize credit conversion table, a list of possible prizes, or a list of high scores.

The frame 1302 is also equipped with links including a select game link 1310 for allowing selection of a game to play and buy credits links 1312, 1313 for purchasing additional game credits. Upon selection of either the select game link 1310 or the buy credits links 1312, 1313, both the user identification code and the site identification code is transmitted to the prize database server for the reasons set forth earlier. Shop links 1314, 1316 are also provided for linking to the prize redemption user interface of the prize database server. Upon selection of one of the shop links 1314, 1316, a site identification code is transmitted in order to allow the prize redemption user interface to be equipped with specifically tailored insignias and other "look and feel" features.

With continuing reference to FIG. 13, a start button 1318 may be included to execute the game that is currently selected. A display bar 1320 may also be shown for advertisement, informative, or any other purposes. Further, a member link 1322 and a help link 1324 may be included for providing various miscellaneous services. Positioned in the frame is a game interface 1326 that is to be executed. Ideally, the game is configured with dynamic HTML.

Figure 14:
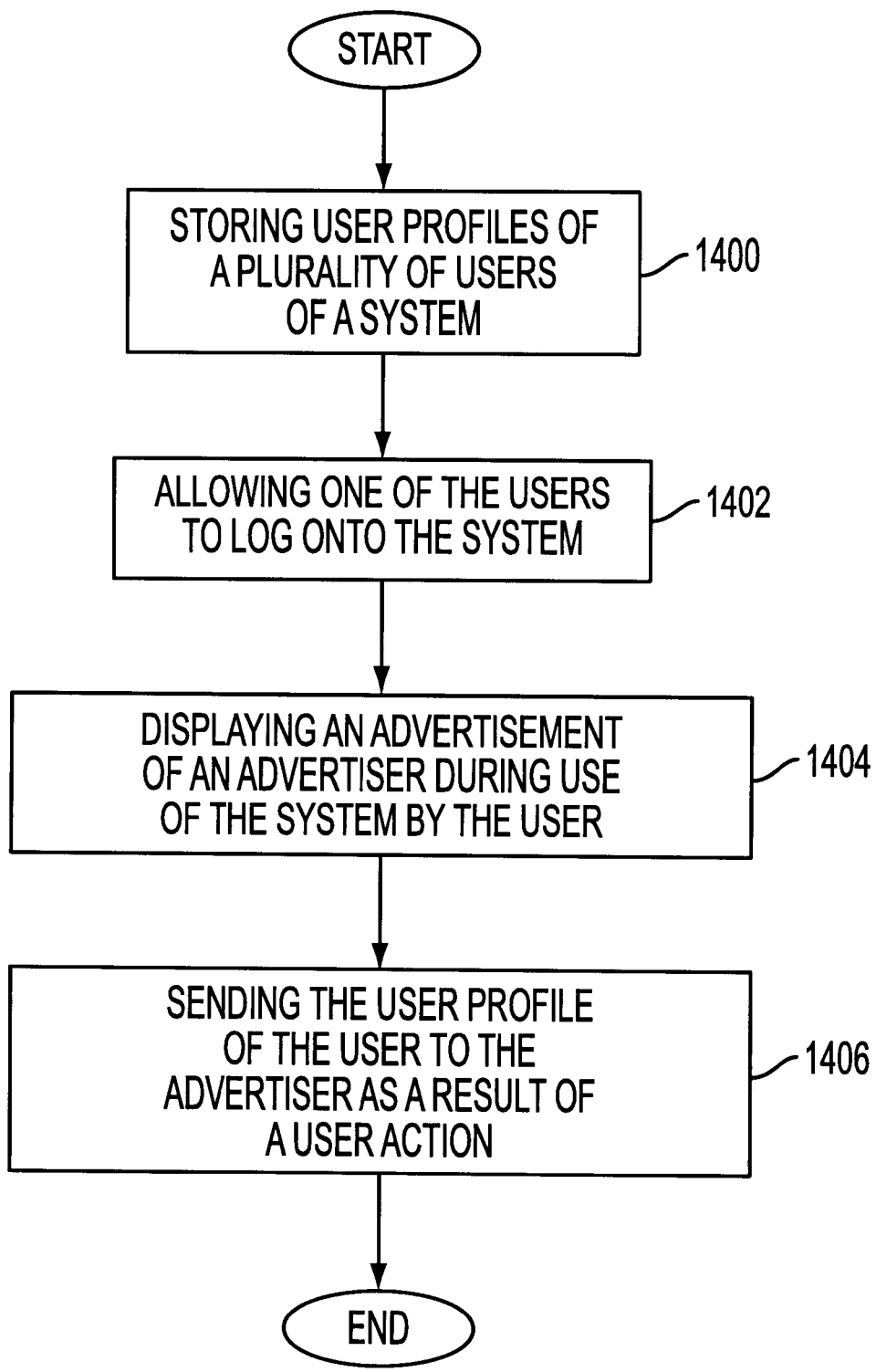
FIG. 14 is a flowchart illustrating the acts involved with an advertisement feedback aspect of the present invention.

FIG. 14 illustrates an optional advertisement feedback capability of the present invention. Such feature is adapted for reporting interest in an advertisement displayed during use of a network system, and in particular, a network gaming system of the present invention. This system enables a provider of the network gaming system to focus advertising towards particular users of the network system and also report the interest shown by particular users towards particular advertisers and advertisements.

As shown in FIG. 14, the advertisement feedback system of the present invention stores user profiles of a plurality of users of a network system in operation 1400. After a user logs onto the network system in operation 1402, an advertisement by a sponsor of the network system is displayed on a visual display of the particular user in operation 1404.

In response to an action by the user, the network system sends the particular user's profile to the sponsor. Note operation 1406. The user profile may contain a great deal of previously collected information. Thus, this system allows a network system provider to strategically pass on a wealth of marketing information of the users of the network system. As an option, the method by which the marketing information is delivered may be selected by the user and may include modes of communication such as electronic mail, ground mail, etc. This selection may be effected during log-on, registration, or at any other time. Also, the user may be connected to a site on the network associated with the advertisers upon a user selecting, or "clicking" on the advertisement. If the marketing information is sent by a network provider, the advertiser may be informed of the delivery of the appropriate information.

The advertisement may relate to an offered prize or a particular game capable of being played on the network gaming system. As an option in this network gaming system embodiment, the user profile of the user may be sent to the advertiser as a result of the user being awarded a prize.

In one embodiment, the user action may occur while the advertisement is being displayed. As one option for this embodiment, the user action may comprise the user actually selecting the displayed advertisement. This way, the provider has a way to identify immediate user interest in a particular advertisement. With such an embodiment, the network system provider is able to easily relay user interest in a particular sponsor at the time that the user actually experiences the sponsor's advertisement. This embodiment also provides a way for a network system provider to determine which advertisements their users are more interested in. With this information, the provider is then able to arrange and time the display of advertisements in an manner to optimize the effectiveness of the advertisements towards the users of the network system.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for providing a game interface, comprising:
   showing a display;
   allowing a game to be executed on the display;
   indicating on the display prize credits awarded based on an outcome of playing the game; and
   depicting a link on the display for depicting a prize redemption interface adapted to allow use of the prize credits to obtain a prize.

2. A method as recited in claim 1 and further comprising displaying a link on the display for allowing a user to select which one of a plurality of games is executed on the display.

3. A method as recited in claim 1 and further comprising displaying a link on the display for allowing a user to purchase game credits required prior to execution of the game on the display.

4. A method as recited in claim 1 and further comprising indicating on the display a number of game credits available to a user to exchange for execution of the game on the display.

5. A method as recited in claim 1 and further comprising displaying conversion information dictating an amount of prize credits awarded based on the outcome of the game.

6. A method as recited in claim 1 and further comprising displaying a specific prize to be awarded, wherein the specific prize is displayed prior to being awarded.

7. A method as recited in claim 1 whereon the display is configured using dynamic HTML.

8. A method as recited in claim 1 and further comprising displaying a start button for beginning execution of the game on the display upon selection thereof.

9. A computer program embodied on a computer readable medium for providing a game interface, comprising:
   a code segment that shows a display;
   a code segment that allows a game to be executed on the display;
   a code segment that indicate on the display prize credits awarded based on an outcome of playing the game; and
   a code segment that depicts a link on the display for depicting a prize redemption interface adapted to allow use of the prize credits to obtain a prize.

10. A computer program as recited in claim 9 and further comprising a code segment that displays a link on the display for allowing a user to select which one of a plurality of games is executed on the display.

11. A computer program as recited in claim 9 and further comprising a code segment that displays a link on the display for allowing a user to purchase game credits required prior to execution of the game on the display.

12. A computer program as recited in claim 9 and further comprising a code segment that indicates on the display a number of game credits available to a user to exchange for execution of the game on the display.

13. A computer program as recited in claim 9 and further comprising a code segment that displays conversion information dictating an amount of prize credits awarded based on the outcome of the game.

14. A computer program as recited in claim 9 and further comprising a code segment that displays a specific prize to be awarded, wherein the specific prize is displayed prior to being awarded.

15. A computer program as recited in claim 9 whereon the display is configured using dynamic HTML.

16. A computer program as recited in claim 9 and further comprising displaying a start button for beginning execution of the game on the display upon selection thereof.

17. A system for providing a game interface, comprising:
   logic that shows a display;
   logic that allows a game to be executed on the display;
   logic that indicates on the display prize credits awarded based on an outcome of playing the game; and
   logic that depicts a link on the display for depicting a prize redemption interface adapted to allow use of the prize credits to obtain a prize.

18. A system as recited in claim 17 and further comprising logic that displays a link on the display for allowing a user to select which one of a plurality of games is executed on the display.

19. A system as recited in claim 17 and further comprising logic that displays a link on the display for allowing a user to purchase game credits required prior to execution of the game on the display.

20. A system as recited in claim 17 and further comprising logic that indicates on the display a number of game credits available to a user to exchange for execution of the game on the display.

* * * * *